US012718323B2

(12) United States Patent
Miscuglio et al.

(10) Patent No.: US 12,718,323 B2
(45) Date of Patent: Aug. 25, 2026

(54) MASSIVELY PARALLEL AMPLITUDE-ONLY OPTICAL PROCESSING SYSTEM AND METHODS FOR MACHINE LEARNING

(71) Applicant: The George Washington University, Washington, DC (US)

(72) Inventors: Mario Miscuglio, Arlington, VA (US); Volker Sorger, Gainesville, FL (US)

(73) Assignee: The George Washington University, Washington, DC (US)

(*) Notice: Subject to any disclaimer, the term of this patent is extended or adjusted under 35 U.S.C. 154(b) by 467 days.

(21) Appl. No.: 18/019,723

(22) PCT Filed: Aug. 5, 2021

(86) PCT No.: PCT/US2021/044767
§ 371 (c)(1),
(2) Date: Feb. 3, 2023

(87) PCT Pub. No.: WO2022/031982
PCT Pub. Date: Feb. 10, 2022

(65) Prior Publication Data

US 2023/0298145 A1 Sep. 21, 2023

Related U.S. Application Data

(60) Provisional application No. 63/061,487, filed on Aug. 5, 2020.

(51) Int. Cl.
*G06T 5/20* (2006.01)
*G06T 5/10* (2006.01)
(Continued)

(52) U.S. Cl.
CPC .................. *G06T 5/20* (2013.01); *G06T 5/10* (2013.01); *G06T 5/50* (2013.01); *G06V 10/143* (2022.01);
(Continued)

(58) Field of Classification Search
CPC .... G06T 5/20; G06T 5/10; G06T 5/50; G06T 2207/20081; G06T 2207/20084;
(Continued)

(56) References Cited

U.S. PATENT DOCUMENTS 6,369,933 B1 * 4/2002 O'Callaghan ........... G06E 3/005 359/247
10,140,720 B1 * 11/2018 Schubert ................ G06V 10/92
(Continued)

FOREIGN PATENT DOCUMENTS

WO WO-01/04687 A1 1/2001
WO WO-2021/211125 A1 10/2021
WO WO-2021/242881 A2 12/2021

OTHER PUBLICATIONS

Chang, Julie, et al. "Hybrid optical-electronic convolutional neural networks with optimized diffractive optics for image classification." Scientific reports 8.1 (2018): 1-10. (Year: 2018).*
(Continued)

*Primary Examiner* — Andrae S Allison
(74) *Attorney, Agent, or Firm* — BLANK ROME LLP

(57) ABSTRACT

Amplitude-only Fourier optical processors is capable of processing large-scale matrices in a single time-step and microsecond-short latency. The processors may have a 4f optical system architecture and may employ reprogrammable high-resolution amplitude-only spatial modulators, such as Digital Micromirror Devices (DMD). In addition, methods are provided for obtaining amplitude-only electro-optical convolutions between large matrices displayed by the DMDs. The large matrices on which convolution is performed may be feature maps corresponding to images and kernel matrices used in neural networks classification systems. Analog optical convolutional neural networks are also provided that perform accurate classification tasks on large matrices. In addition, methods are provided for off-
(Continued)

chip training the analog optical convolutional neural networks. The training includes building an accurate physical model for the analog optical processor and performing computer simulations of the optical processor according to the physical model. The methods do not need to employ any interferometric scheme.

15 Claims, 18 Drawing Sheets

(51) Int. Cl.
*G06T 5/50* (2006.01)
*G06V 10/143* (2022.01)
*G06V 10/764* (2022.01)
*G06V 40/18* (2022.01)

(52) U.S. Cl.
CPC .......... *G06V 10/764* (2022.01); *G06V 40/193* (2022.01); *G06T 2207/20081* (2013.01); *G06T 2207/20084* (2013.01); *G06T 2207/20221* (2013.01)

(58) Field of Classification Search
CPC ........ G06T 2207/20221; G06V 10/143; G06V 10/764; G06V 40/193; G06N 3/045; G06N 3/065; G06N 3/0675; G06N 3/08
See application file for complete search history.

(56) References Cited

U.S. PATENT DOCUMENTS 10,366,328 B2 * 7/2019 Yang .................... G06N 3/048
10,409,084 B2 9/2019 New et al.
11,600,060 B2 * 3/2023 Dai ...................... G06V 10/82
2008/0181467 A1 * 7/2008 Zappia .................. G06V 40/19 382/117
2010/0074478 A1 3/2010 Hoyos et al.
2014/0085713 A1 3/2014 Popescu et al.
2018/0101747 A1 * 4/2018 Yang ...................... G06N 3/02
2019/0087725 A1 * 3/2019 Yang ...................... G06N 3/08
2020/0202590 A1 6/2020 George et al.
2021/0019602 A1 * 1/2021 Yang .................... G06N 3/045
2021/0232915 A1 * 7/2021 Dalli ................... G06F 18/2113
2022/0180175 A1 * 6/2022 Guo ..................... G06N 3/084
2022/0327371 A1 * 10/2022 Ozcan ................ G02B 27/4277
2022/0381745 A1 * 12/2022 Amjadian .......... G02B 27/0955

OTHER PUBLICATIONS

Colburn, Shane, et al. "Optical frontend for a convolutional neural network." Applied optics 58.12 (2019): 3179-3186. (Year: 2019).*
Muminov, Baurzhan, and Luat T. Vuong. "Fourier optical preprocessing in lieu of deep learning." Optica 7.9 (2020): 1079-1088. ( Year: 2020).*
Miscuglio, Mario, et al. "Massively parallel amplitude-only Fourier neural network." Optica 7.12 (2020): 1812-1819. (Year: 2020).*
International Search Report and Written Opinion for PCT/US2021/044767 dated Nov. 2, 2021, 10 pages.

* cited by examiner

FIG. 4

FIG. 5 i) DMD Pattern 8

Zoomed ii) Propagation Mismatch 9 iii) Lens (Aperture) + Aberrations 10 iv) Spatial Frequency Filter + second lens (aperture) 11 v) Camera 12

FIG. 6
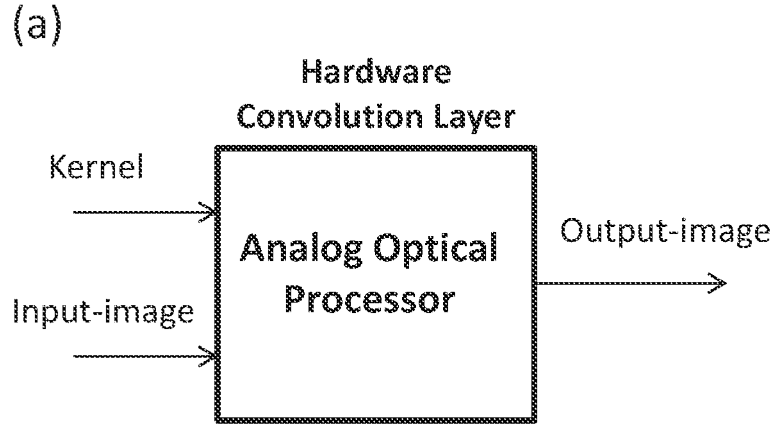
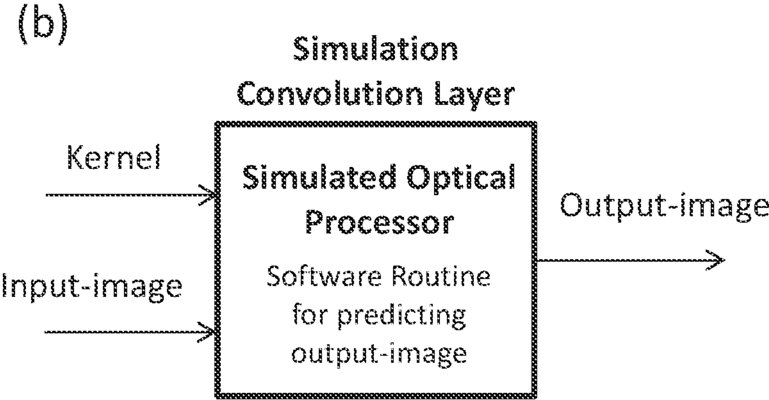

FIG. 9
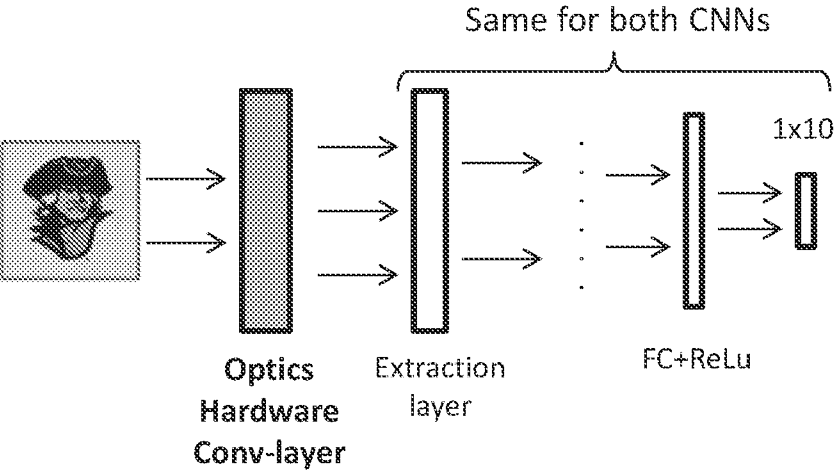
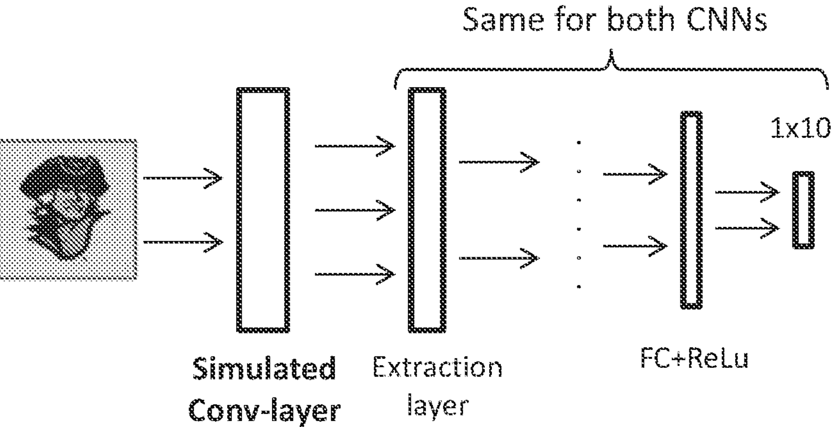

FIG. 11

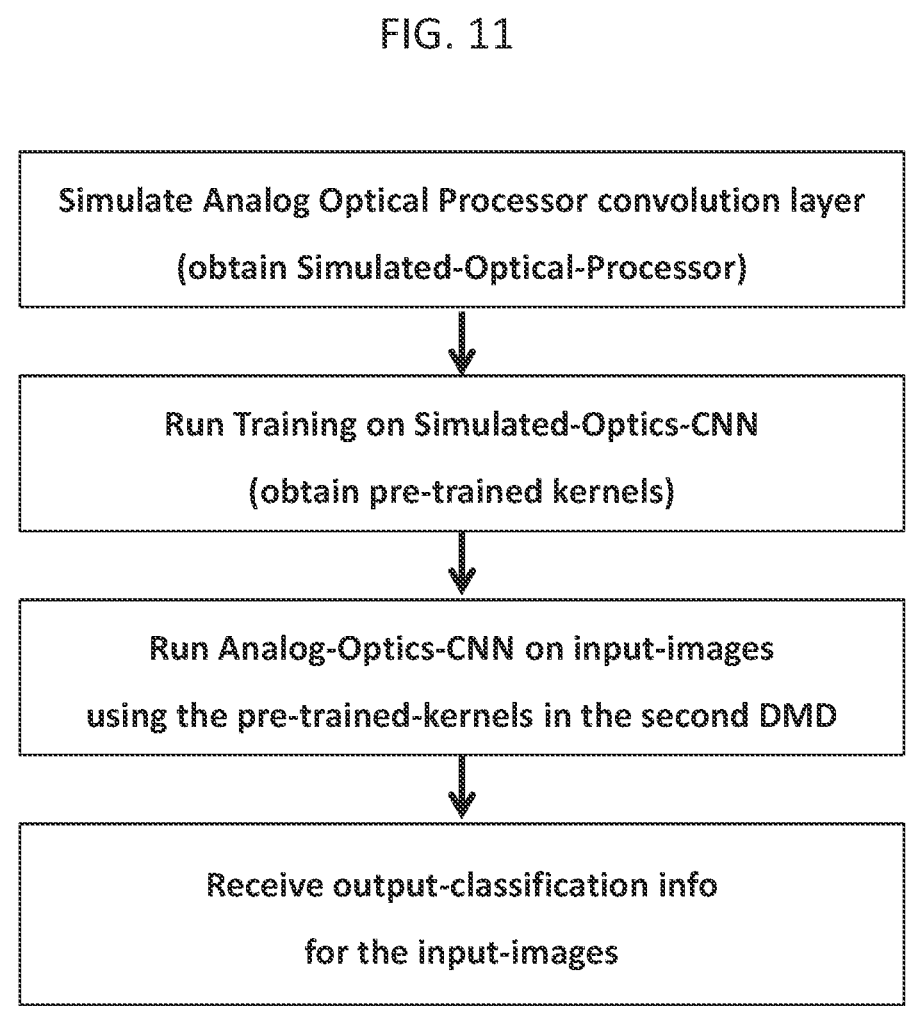

Simulate Analog Optical Processor convolution layer
(obtain Simulated-Optical-Processor)

↓

Run Training on Simulated-Optics-CNN
(obtain pre-trained kernels)

↓

Run Analog-Optics-CNN on input-images
using the pre-trained-kernels in the second DMD

↓

Receive output-classification info
for the input-images (b)

| Model | MNIST | CIFAR |
|---|---|---|
| Space-domain convolution (full precision) | 98% | 63% |
| Simulation model (Fourier convolution) | 98% | 62% |
| Hardware model (without fine-tuning) | 92% | 25% |
| Hardware model (with fine-tuning) | 98% | 54% |

FIG. 14

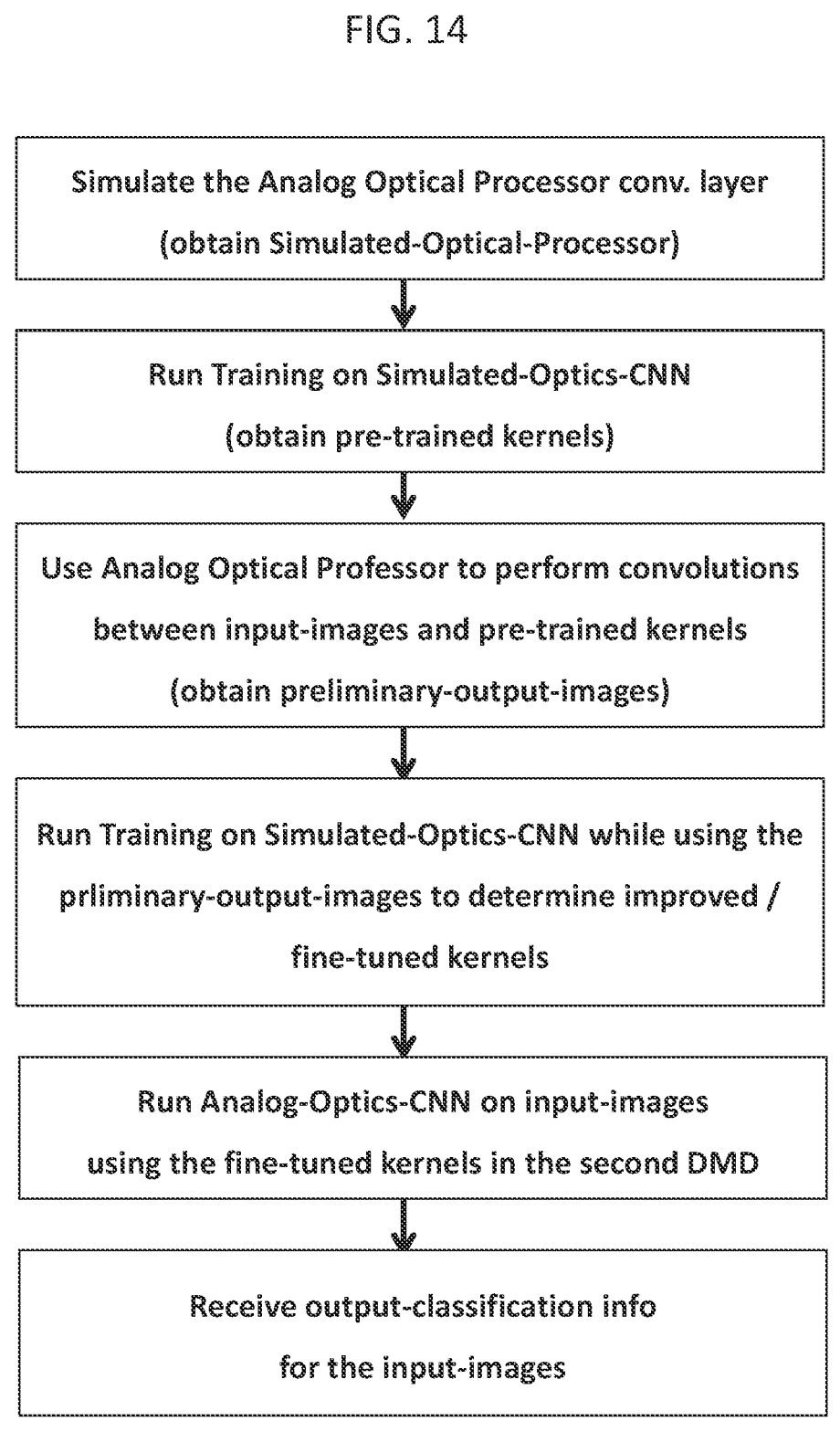

Simulate the Analog Optical Processor conv. layer
(obtain Simulated-Optical-Processor)

↓

Run Training on Simulated-Optics-CNN
(obtain pre-trained kernels)

↓

Use Analog Optical Professor to perform convolutions between input-images and pre-trained kernels
(obtain preliminary-output-images)

↓

Run Training on Simulated-Optics-CNN while using the prliminary-output-images to determine improved / fine-tuned kernels

↓

Run Analog-Optics-CNN on input-images using the fine-tuned kernels in the second DMD

↓

Receive output-classification info for the input-images

Figures 18A, 18B:
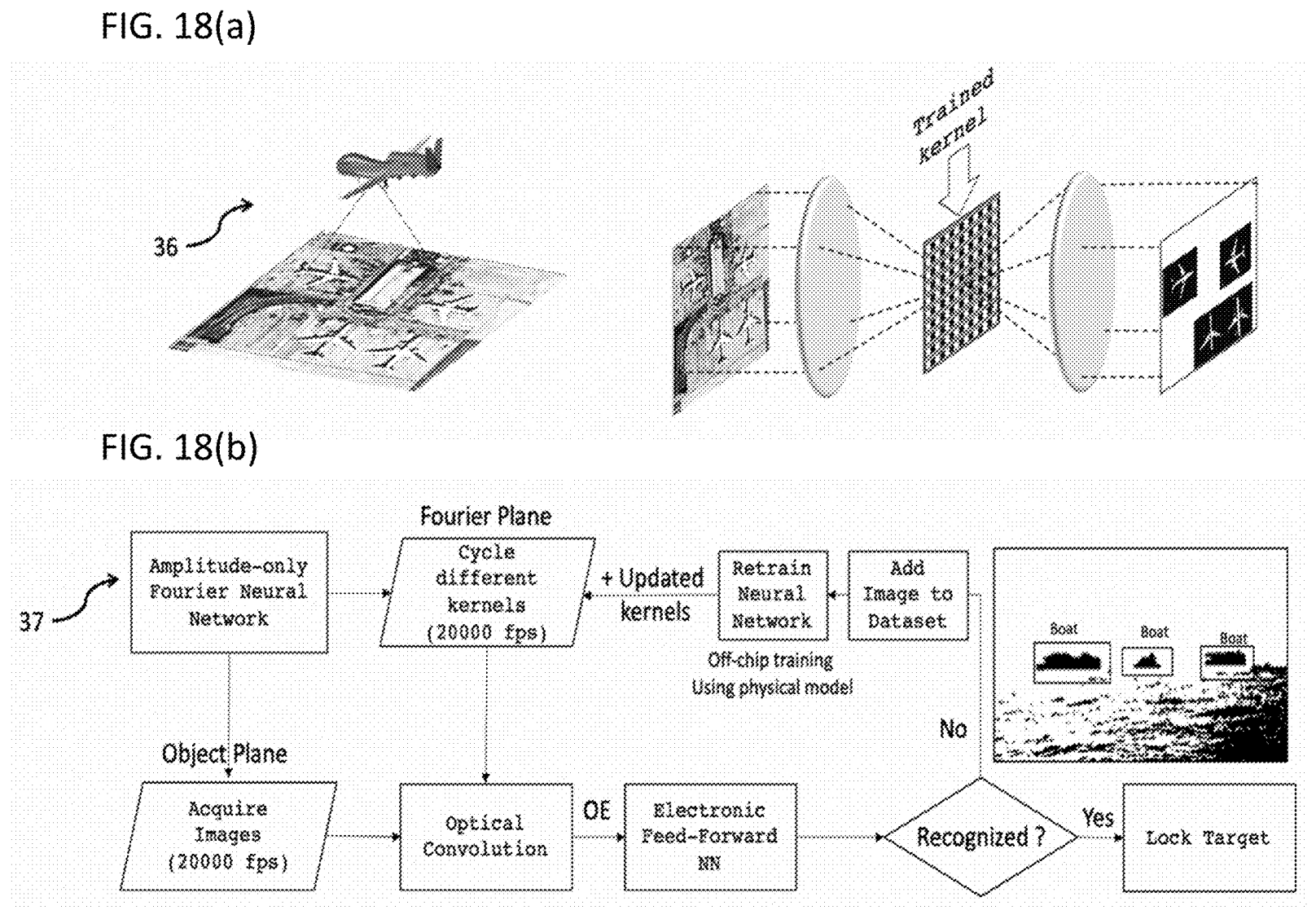

Trained kernel

Amplitude-only Fourier Neural Network

Fourier Plane

Cycle different kernels (20000 fps)

+ Updated kernels

Retrain Neural Network

Off-chip training Using physical model

Add Image to Dataset

Object Plane

Acquire Images (20000 fps)

Optical Convolution

OE

Electronic Feed-Forward NN

Recognized ?

No

Yes

Lock Target

Boat

Boat

Boat

MASSIVELY PARALLEL AMPLITUDE-ONLY OPTICAL PROCESSING SYSTEM AND METHODS FOR MACHINE LEARNING

CROSS-REFERENCE TO RELATED APPLICATIONS

The present application is a national phase application of PCT/US2021/044767, filed on Aug. 5, 2021, which claims priority to U.S. Application No. 63/061,487, titled "Massively Parallel Amplitude-only Optical Processing System for Machine Learning" and filed on Aug. 5, 2020. The disclosures of which are incorporated by reference herein in their entirety.

STATEMENT REGARDING FEDERALLY SPONSORED RESEARCH OR DEVELOPMENT

This invention was made with government support under Grant No. N00014-19-1-2595 awarded by the Office of Naval Research (NAVY/ONR) Electronic Warfare. The government has certain rights in the invention.

FIELD OF THE INVENTION

The present invention relates to the field of optical processing for artificial intelligence and machine learning applications.

BACKGROUND

Machine-intelligence has become a driving factor in modern society. However, its demand outpaces the underlying electronic technology due to limitations given by fundamental physics such as capacitive charging of wires and by system architectures for storing and handling data, both driving recent trends towards processor heterogeneity.

Deep learning has thrived due to its ability to learn patterns within data and perform intelligent decisions and in some cases has reached performances superior to human performances. Convolution neural networks (CNN) lie at the heart of many emerging machine learning applications, especially those related to the analysis of visual imagery. From a neural network (NN) point of view, a CNN extracts specific features of interest, using linear mathematical operations such as convolutions. Convolutions combine two pieces of information, namely a feature map and a kernel, to form a third function, such as a transformed feature map. The feature maps, the kernels and the convolution operations between two matrixes are used herein according to their use and meaning in the neural networks field.

Convolution layers are responsible for consuming the majority (~80%) of the compute resources during inference tasks. This results in a significant latency and computational power consumption, especially for datasets comprising appreciably large feature maps, or requiring deep CNNs for achieving high accuracy, even when the network has been trained and the memory initialized. For this purpose, data-parallel specialized architectures such as Graphic Processing Units (GPUs) and Tensor Processing Units (TPUs), providing a high-degree of programmability, deliver dramatic performance gains compared to general-propose processors.

When used to implement deep NN performing inference on large two-dimensional data sets such as images, TPUs and GPUs are rather power-hungry and require a long computation time (>tens of ms), which is function of the complexity of the task and accuracy required. This translates into manifold operations with complex kernel and larger feature map.

As it stands, improving computational efficiency of CNNs is still a challenge, due to the widespread relevance to many applications. Task-specific accelerators based on free-space optics bear fundamental homomorphism for massively parallel and real-time information processing given the wave-nature of light. However, initial results are frustrated by data handling challenges and slow optical programmability.

SUMMARY

Exemplary embodiments of the present invention provide analog amplitude-only Fourier optical processors and systems capable of processing large-scale matrices (e.g. larger than 1,000×1,000 elements) in a single time-step and micro-second-short latency (e.g. 100 microseconds). The analog amplitude-only Fourier optical processors may be referred hereinafter as Analog-Optical-Processors.

Exemplary embodiments of the present invention provide methods for obtaining amplitude-only (AO) electro-optical convolutions between large matrices (e.g. feature maps corresponding to images and matrices used as kernels in neural networks) displayed by reprogrammable high-resolution amplitude-only spatial modulators (e.g. Digital Micromirror Devices, kHz-fast reprogrammable) based on two stages of Fourier Transforms (FT), without the support of any interferometric scheme. The large matrices on which convolution is performed may be feature maps corresponding to images and kernel matrices used in neural networks classification systems. The methods may be implemented via the Analog-Optical-Processors.

Exemplary embodiments of the present invention provide optoelectronic systems, such as the Analog-Optical-Processor, in which low-power laser light is actively patterned by electronically configured DMDs in both the object and Fourier plane of a 4f system, encoding information only in the amplitude of the wave-front. The DMDs may include programmable micromirrors which can be individually controlled. The DMDs may include a large number of programmable micromirrors (e.g. 2 million or more), with a certain resolution depth (e.g. 1 bit, 8 bit, etc.) and a high speed (e.g. about 1,031 Hz for 8 bit resolution and about 20 kHz for 1 bit resolution). The systems may achieve reprogrammable operations for near real-time, and may have about 100× lower system latency than current GPU accelerators image processing. The systems may achieve a throughput of up to 4-Peta operations per second at 8 bit resolution. The systems may emulate on the same platform multiple convolutional layers of a NN.

Exemplary embodiments of the present invention provide analog optical convolutional neural networks (hereinafter may be referred as Analog-Optics-CNNs) performing accurate classification tasks on large matrices. When implemented using DMDs at 10 kHz rates, for obtaining intelligent classification results, the optical neural networks herein outperform current GPU based NNs and the NNs based on phase-based display technology in terms of latency, by one and two orders of magnitude, respectively. The analog optical convolutional neural networks may be referred hereinafter as Analog-Optics-CNNs.

Exemplary embodiments of the present invention provide methods for training the Analog-Optics-CNNs off-chip, using a detailed physical model which describes the optical system and its nonidealities (e.g. optical aberrations and misalignments). After experimentally validating the model and retraining the following fully-connected layer to compensate for values discrepancies, the optical processing system (in a context of a neural network Analog-Optics-CNN) obtained a classification accuracy of 98% and 54% for MNIST and CIFAR-10, respectively, with a throughput up to 1,000 convolutions per seconds between two 2MP images, which is one order of magnitude faster than the state-of-the-art GPU.

In one embodiment, the optical processing systems herein may be employed as an accelerator for performing artificial intelligent tasks, such as convolution neural networks, to provide real-time, massively parallel throughput compared to current fully electronic systems. An example of the system and its alternative forms are provided. Results and simulations for the Neural network inference are also provided and prove the validity of the approach. The results indicate that these intelligent information processing schemes (i.e. the systems, devices and methods disclosed herein) open new perspectives of a flexible and compact platforms which may be transformative for diverse applications. The applications may range from image analysis to image classification and super-resolution imaging on unmanned aerial vehicles. The systems and methods herein may also enable high bandwidth free-space communication in data centers, intelligently pre-processing data locally at the edge of the network. The inventions herein enable the calculation of massively parallel amplitude-only convolutions in the Fourier domain, and enable accurate inference with processing time which is orders of magnitude smaller (e.g. one order of magnitude) than state-of-the art electronic paradigms.

The foregoing general description and the following detailed description are only exemplary and explanatory and they are intended to provide further explanation of the invention as claimed. However, achieving the above purposes and/or benefits is not a necessary feature to each of the exemplary embodiments and claims may recite subject matter that does not achieve the above stated purpose.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIG. 4 shows an Analog-Optical-Processor which can be used as convolutional layer in a CNN and includes a computing and control system.

FIG. 5 shows a diagram of the factors considered in the physical model and in simulations for the Analog-Optical-Processor.

FIGS. 6*a, b* show diagrams for the data processing performed by the Analog-Optical-Processor and the Simulated-Optical-Processor.

FIGS. 9*a, b* shows a diagram comparing the architectures of an Analog-Optics-CNN and its corresponding Simulated-Optics-CNN.

FIG. 11 shows a diagram for a method of using an Analog-Optics-CNN system to perform classification of images by employing pre-trained kernels.

FIG. 14 shows a diagram for a fine-tuned method of using an Analog-Optics-CNN system to perform classification of images by employing pre-trained kernels and fine-tuned kernels.

FIG. 18*a* shows an image classification system for performing real time classification in photogrammetry applications and for target recognition.

FIG. 18*b* is a flow diagram to isolate and track targets.

DETAILED DESCRIPTION

Figure 1:
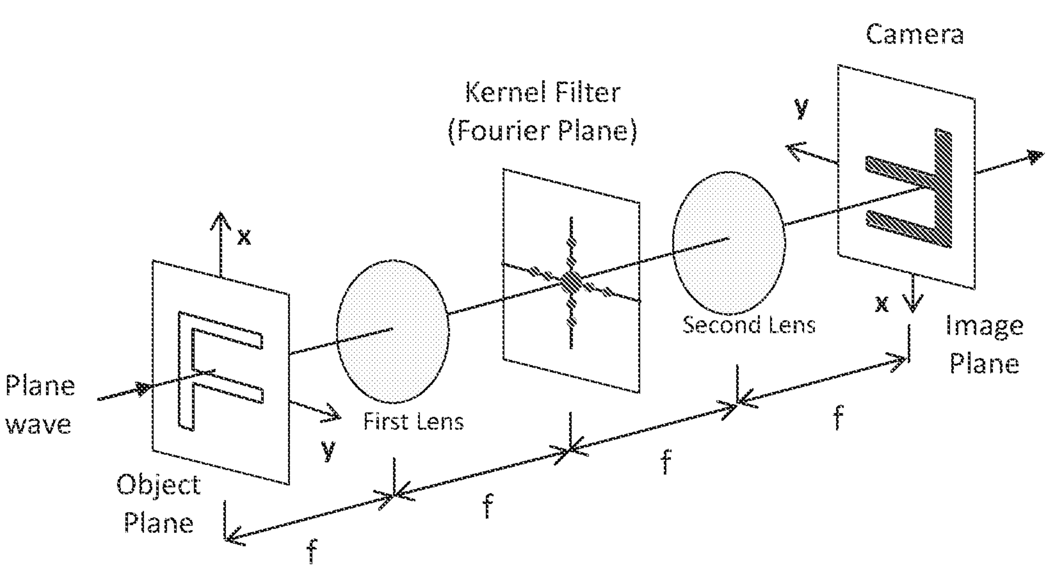
FIG. 1. shows a principle diagram for an Analog-Optical-Processor based on 4F Fourier optical systems.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

(A). The Analog-Optical-Processor

An Analog-Optical-Processor capable of processing large-scale matrices (e.g. 1,000×1,000) is described with reference to FIGS. 1-4. The Analog-Optical-Processor is configured to process large-scale matrices in a single time-step and with a short latency (e.g. 100 microsecond-short).

The Analog-Optical-Processor is based on 4F systems such as shown in FIG. 1. The 4F system may include an object-plane (where the input-image of the object is formed via, e.g., a first spatial-amplitude-filter), a first focal-lens, a Fourier plane where a second-spatial-amplitude-filter (hereinafter kernel filter) is disposed; a second-lens; and a detector array (camera) disposed in the image plane. The object plane, the first-lens, the Fourier plane, the second lens, and the image plane/detector array are equally spaced by one focal-length. The functioning of the 4F system is as follows: an input-image (i.e. the letter "F") is generated at the object plane (e.g. via a plane wave which is spatially modulated in the object plane by an optical component, such as: a mask, micromirror array, metasurfaces, etc.); the input-image is transmitted to a first-lens which Fourier transforms the image onto the Fourier plane; the second spatial-amplitude-filter kernel spatially modulates the image in the Fourier plane (the Fourier transform of the input image is pixel-wise multiplied with the kernel); the light from the kernel is received by the second lens which performs an inverse Fourier transform projecting it on the image plane as output-image; the output-image is converted into electronic domain by the camera.

Figure 2:
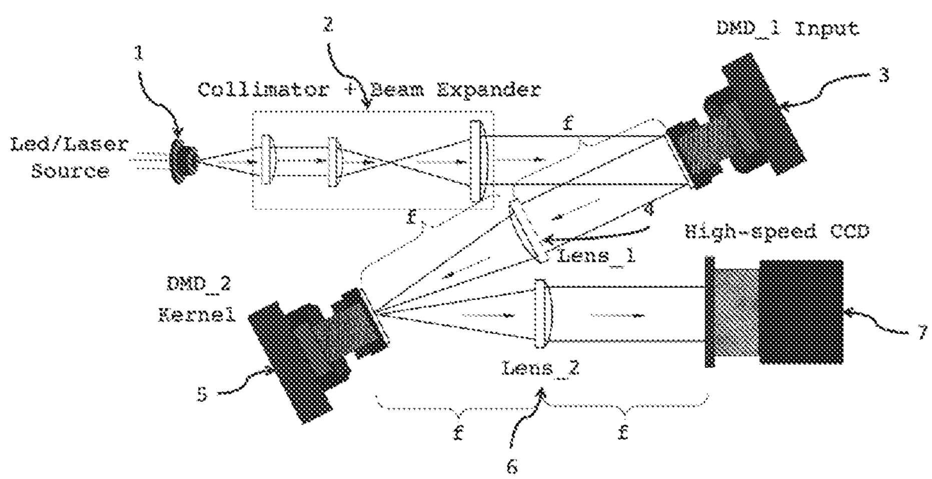
FIG. 2. shows an Analog-Optical-Processor employing Digital Micromirror Devices for providing amplitude-only spatial modulation.

FIG. 2 shows an exemplary embodiment of an Analog-Optical-Processor which is a 4F optical processing system where the spatial-amplitude-filters are implemented via Digital Micromirror Devices (DMDs) and which can be used a convolutional layer of a neural network. The Analog-Optical-Processor may include the following components: an LED/laser source (1) emitting a beam, a collimator and a beam expander (2), a first DMD (DMD-1) (3), a first lens (Lens-1) (4), a second DMD (DMD-2) (5), a second lens (Lens-2) (6), and a camera (e.g. high-speed CCD) (7). The DMD-1, Lens-1, DMD-2, Lens-2 and the camera may be spaced by one focal length "f" so as to form a 4F system.

The beam (e.g. low-power laser beam at 633 nm, HeNe Laser) may be collimated and expanded to uniformly intersect the entire active area of DMD-1 in the object plane. DMD-1 provides spatial modulation defining the input-image (feature map), by independently tilting each micromirror of its array according to a pre-loaded pattern or input image/data. The DMD-1 in the object plane may be oriented with a tilting angle (e.g. 22.5°) with respect to the normal incidence and may be rotated in-plane by an angle (e.g. 45°). Light reflected from DMD-1 is Fourier-transformed passing through the first Fourier lens disposed one focal length "f" from the first DMD-1 in the object plane. The pattern in DMD-2 acts as a spatial mask/filter in the Fourier plane, selecting the spatial frequency components of the input image. The Fourier transform of the input image is pixel-wise multiplied (amplitude only) with the kernel pattern (displayed by the DMD-2) in the Fourier plane of the 4-f system. The frequency filtered image (result of the product) is inverse Fourier transformed into the real space by the second Fourier lens and imaged by a camera (e.g. high-speed camera) disposed in the image-plane. The camera may image a square of the product result. An all-optical or electronic nonlinearity may be applied to each camera pixel.

Both Fourier transformation steps are performed entirely passively, i.e. zero-static power consumption, which is in stark contrast to performing convolutions as dot product multiplications in electronics. The Analog-Optical-Processor is a 4F Fourier optical system, which acts as an Amplitude Only Fourier filter (AO-FF).

The invention is not limited by the particular geometries (e.g. angles, distances) and configurations disclosed herein. Various modification of geometrical parameters (e.g. angles, distances) can be made without limiting the scope of the invention.

The invention is not limited by the particular optical components used such as lenses and spatial-filters. The functionality of the lenses may be implemented by equivalent components, such as: metalenses, diffractive optics tools, curved mirrors, and metareflectors. The functionality of the spatial-amplitude-filters/DMDs may be implemented by equivalent components, such as: amplitude only diffractive masks, absorptive films, prepatterned films, phase change materials, two dimensional materials.

In an exemplary embodiment of the invention, the input-image may be provided by the imaged object (e.g. input-image may be disposed on the object plan) itself and the DMD-1 is not needed. In an exemplary embodiment, DMD-1 and/or DMD-2 may be replaced by other types of spatial-amplitude-filters, such as: amplitude only diffractive masks, absorptive films, prepatterned films, phase change materials, 2 dimensional materials.

Figure 3:
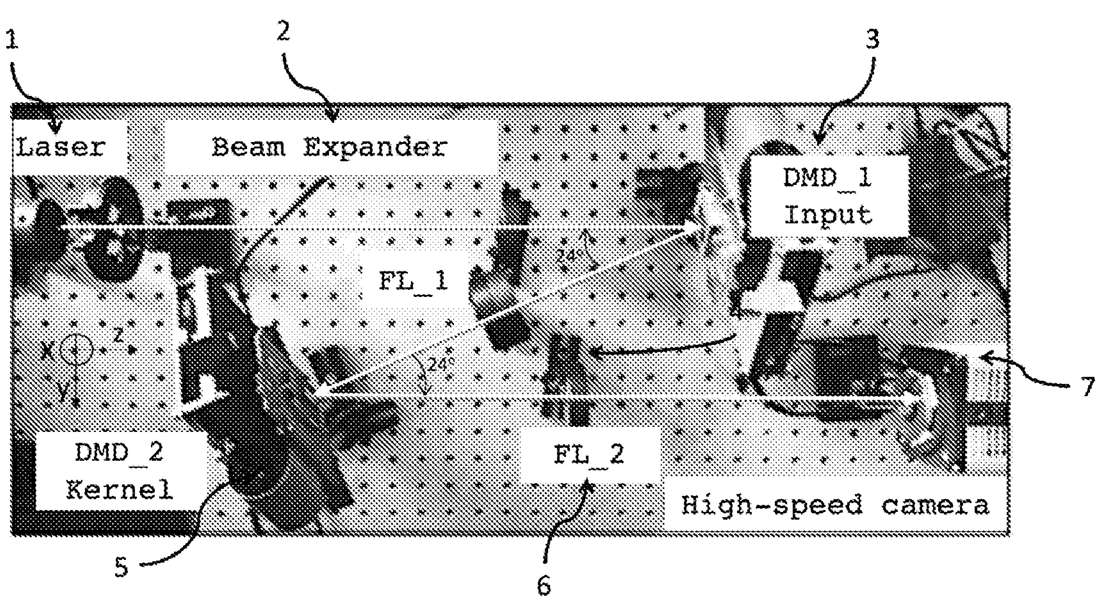
FIG. 3 shows a photograph of a prototype for the Analog-Optical-Processor employing Digital Micromirror Devices.

FIG. 3 shows an exemplary embodiment of an Analog-Optical-Processor as described in FIG. 2 (photograph of a working prototype). In this embodiment both input images and kernels are updated with a frequency of 20 kHz at 1 bit and 1 kHz at 8 bit. The integration time of the high-speed Charge Coupled Device camera is function of its resolution. High-speed cameras with frame rate equal to update speed of the digital micromirror devices may be used. The resolution of the DMDs is 2 Megapixel, but higher-resolution may be used. High-speed analog micro-opto-electro-mechanical system (MOEMS) may be used. The two DMDs are in specular orientation. The DMDs are rotated out of plane (zy) by 24° degrees, which is parallel to the mirror on-state plane, and by 45° in plane (xy). The resolution of the DMDs and the focal length of Lens-1 are selected to resize the Fourier Transform to the active area of DMD-1. The focal length of the second Fourier lens is selected to generate an inverse Fourier transform of the same dimension as the CCD camera sensor.

(B). The Analog-Optical-Processor as Convolution Layer in NN

Figure 4:
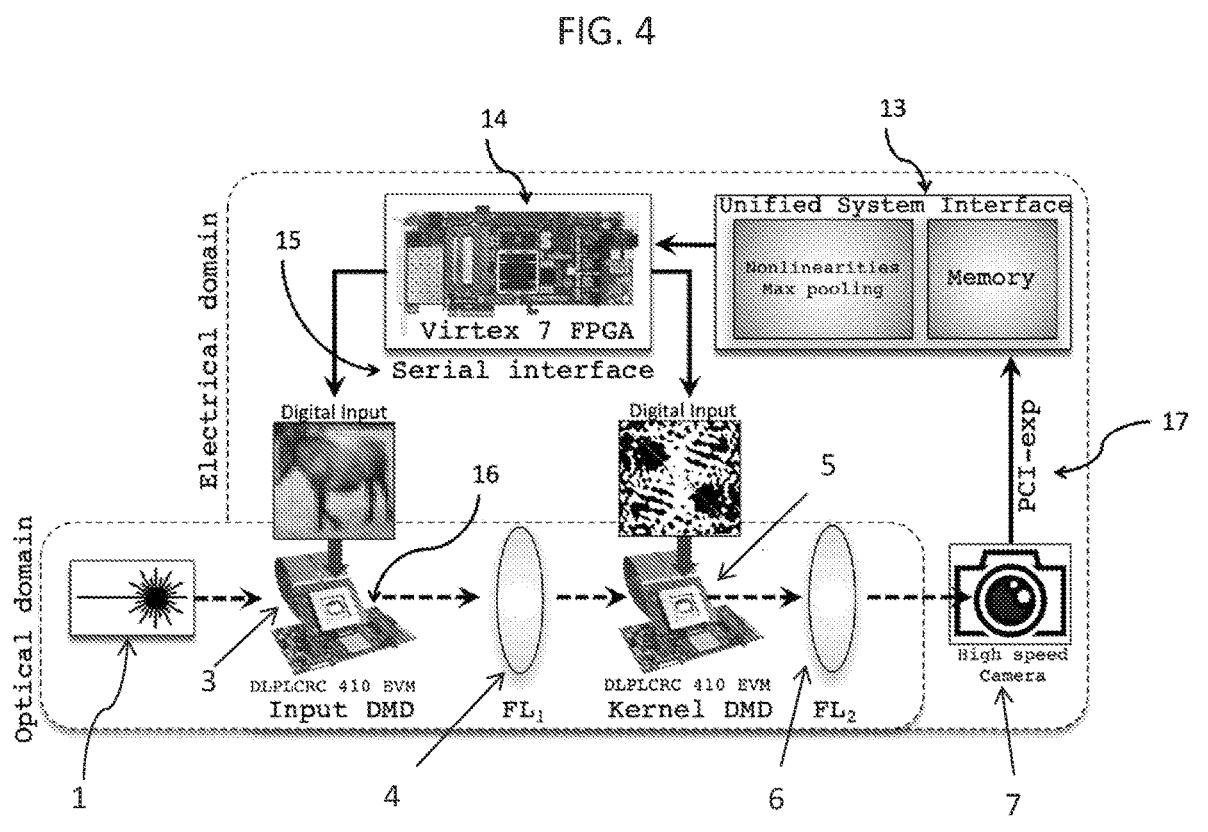

FIG. 4 shows an exemplary embodiment of an Analog-Optical-Processor and a computing and control system configured to process data and to control the analog processor. The Analog-Optical-Processor may include: data input/output interfacing and electronic architecture which performs data synchronization, data storage and the rest of the neural network tasks. In addition to the components described with reference to FIGS. 1-2, the Analog-Optical-Processor may include: a computing device including memories, a unified system interface; and a serial interface. The computing device stores input images and kernels.

The computing device (13) loads the input image as well as the kernel (e.g. 1920×1080 image, 8 bit deep, at a rate of 1000 Hz) to the DMDs by means of a HDMI cable or directly generated through an FPGA (e.g. Virtex 7) (14), which may connect to the Digital Light Processing (DLP) boards (15) (e.g. made by Texas Instrument) of the 2 DMDs 3 and 5 through a serial connection (16). The serial connection may be configured to reduce the latency in providing the signals and allowing for processing while streaming data. The amplitude only Fourier filtered images are detected with a high-speed charge-coupled-device (CCD) camera (e.g. 1000 Frames/s with 8 bit resolution) connected through PCI-express (17) to the unified system interface. The unified system interface is configured to store the data or process it implementing other NN tasks, such as max pooling, activation function and fully connected layer. Thereby the Analog-Optical-Processor may be used as convolution-layer in various NN system.

For deeper NNs which include multiple convolution layers, the Analog-Optical-Processor may be used to implement multiple convolution layers. For emulating deeper neural networks the resulting images (or processed images of the output images) could be potentially loaded into the 1st DMD. Images collected by the camera may be processed and loaded back into the $1^{st}$ DMD, and thereby further processed by the convolution layer.

(C). Physical Model & Simulation of the Analog-Optical-Processor

Figure 5:
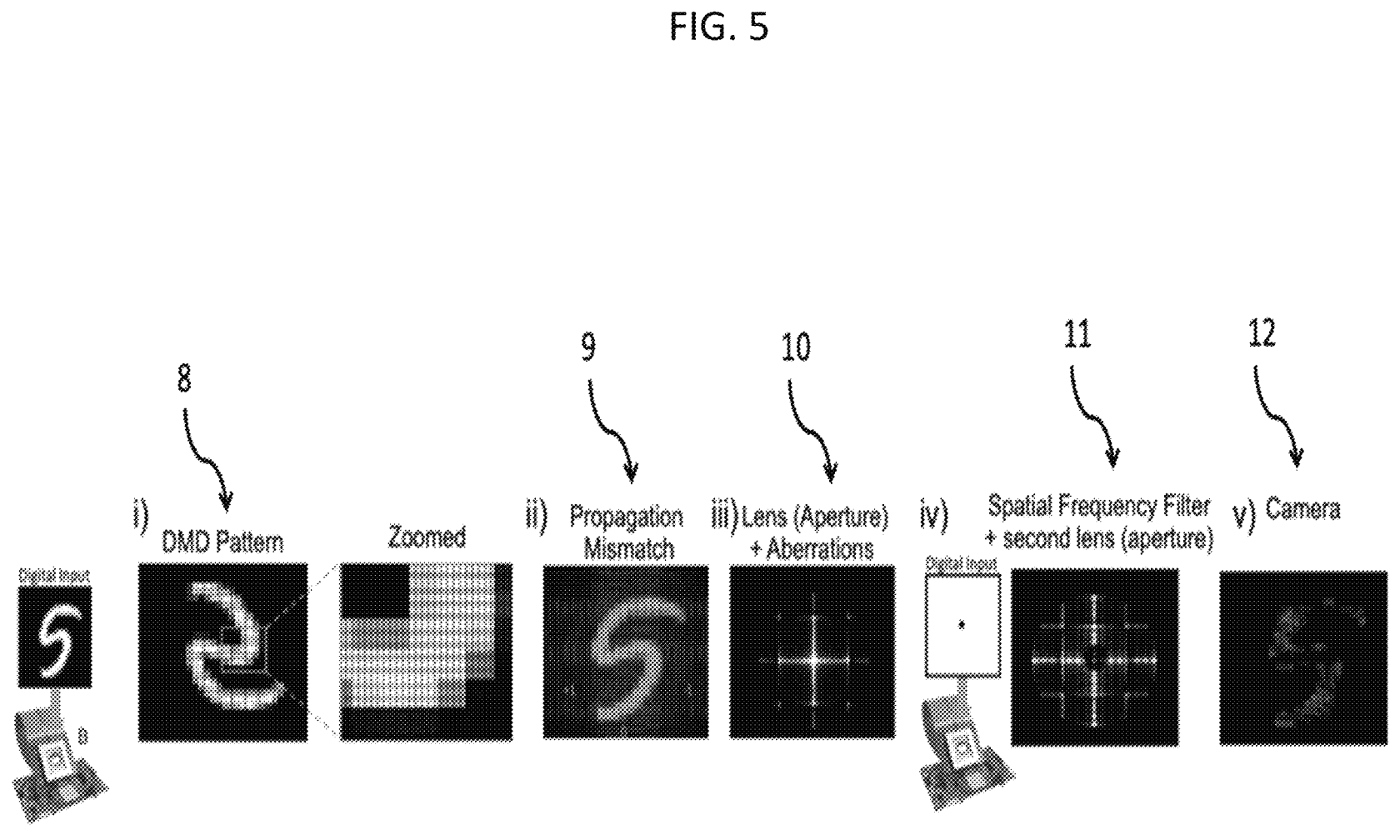

One example physical model and simulation of the Analog-Optical-Processor are described hereinafter with reference to FIG. 5. The physical model and simulation for the Analog-Optical-Processor may be used for training the neural network off-chip so as to obtain physically meaningful trained kernels.

The physical model is used for training the neural network off-chip and obtaining physically meaningful trained kernels. The factors considered in the physical model and simulations are described with reference to FIG. 5 in the following: i). the input pattern is generated considering the DMDs' Magnitude Transfer Function (MTF), including contrast (reflectivity) and effective pixel size (factor 8); ii) the slanted angle at which the DMDs are oriented, by assigning a non-uniform phase delay (function of the inclination of the plane) and the resulting propagation mismatch (factor 9); iii) the lens aperture and aberration using Seidel Polynomial (factor 10); iv). spatial frequency filter (pixel wise product with the 2nd DMD pattern) and second lens aperture and aberration, and opposite non-uniform phase given by the orientation and slanted angle of the 2nd DMD (factor 11); and v). Camera which integrates the intensity of the square of the electric field and eventually reduces the pixel size, if camera has different pixel resolution than the DMDs (factor 12).

The first step is modelling the magnitude transfer function (MTF) of the DMDs or amplitude-only mask/film/metasurface which represents the capability of transferring the modulation depth of the input to the output signals at a specific spatial frequency, which represents the degree of fidelity of the digital signal. For the DMD, each pixel is considered a square mirror with a hole etched at the center, which does not reflect light (pin on which the micromirror is hinged), and each mirror is separated from the neighboring mirrors by a small distance. When a driving electrical signal is applied to the DMD, an electro-static force is created between the electrodes of the selected mirror, so that it is tilted to deliver the illuminating light into the optical system (24°). In state "OFF" the mirror will reflect the illuminating light out of the optical system. The DMD module used in the system is constituted of an array of up to 1920×1080 micromirrors with full addressing circuitry.

To set the pixels, each mirror can be individually driven, such as by a motor or solenoid or the like, to rotate by applying a potential difference between the mirror and the addressing electrode. The response time of each mirror is 10 μs, and the addressing voltage is 5 V. The pixel pitch of the micromirror array of the DMD is about 17 μm. Each pixel is a square micromirror of dimensions 16 μm×16 μm, and with an etched hole of 1 μm diameter at the center. Therefore, the fill factor r is approximately equal to 16/17, and the normalized radius of the hole, rc, is 0.5/17. For this reason, the algorithm performs a 17×17 pixel expansion of the input image associating the pattern of the mirror for modelling the optical image fidelity. The MTF also takes into account imperfect contrast of the ON-OFF ratio which can be altered for each pixel in an 8 bit resolution depth (factor 8). The model follows in characterizing the non-uniform phase induced by the orientation and tilted angle of the micromirror array with respect to the propagating beam direction (factor 9). The electric field which accounts for the tilting angle of the DMD and its orientation in space is obtained by elementwise multiplication of the field patterned by the 1st DMD and phase term proportional to the distance from the center and tilting angle θ.

$$E_{Ph\_correction} = E_{DMD}\phi \qquad \text{Eq. 1}$$

where the element of the matrix $\phi_{i,j}$ is the phase term, computed $\phi_{i,j}=e^{-i(\sin\,\theta\ d_{i,j}2\pi/\lambda)}$, where $d_{i,j}$ is the physical distance between the centre of the DMD, considering the 45° in-plane rotation.

The wavefront of the input image g(x,y) passing through the lens is Fourier transformed at a distance 2f from where it was originated. G(u,v) according to Fresnel Integral:

$$G(u, v) = \int_{-\infty}^{+\infty}\int g(x, y)\exp[-i2\pi(ux+vy)]dxdy \qquad \text{Eq. 2}$$

The change of coordinates from the spatial frequency domain to the real space in the Fourier plane is function of the wavelength and focal length $$(u, v) = \left(\frac{x''}{\lambda f}, \frac{y''}{\lambda f}\right).$$

Next, we take into account the lens aperture, and aberrations to the wave-front according to characteristic Seidel coefficients. The seidel coefficients considers potential Defocus, Spherical, Coma, Astigmatism and Field curvature Distortion of the lens and modify the phase term (factor 10), as shown in Eq. 3.

$$W(\hat{u}_0; \hat{x}, \hat{y}) = W_d(\hat{x}^2+\hat{y}^2) + W_{040}(\hat{x}^2+\hat{y}^2)^2 + W_{131}\hat{u}_0(\hat{x}^2+\hat{y}^2)\hat{x} + W_{232}\hat{u}_0^2\hat{x}^2 + W_{220}\hat{u}_0^2(\hat{x}^2+\hat{y}^2) + W_{311}\hat{u}_0^3\hat{x}. \qquad \text{Eq. 3}$$

$$H = A(u, v)e^{-ikW}, \qquad \text{Eq. 4}$$

being $u_0$ normalized image height, defined along the u axis in the imaging plane, A is the circular function which defines the circular aperture, given in terms of exit pupil size and pupil distance. The aberrated wave-front of the Fourier transform is obtained by multiplying it with the H functions. In this view, for a fixed wavelength, the lens is selected with respect to its focal length which dimension the Fourier transform. We exploit the entire resolution of the 2nd DMD for having the max degree of freedom in selecting and filtering the spatial frequency of the input images without losing frequency components.

$$G'(u, v) = H(u, v)\cdot G(u, v) \qquad \text{Eq. 5}$$

The interaction with the second DMD is obtained by performing a pixel-wise multiplication between the 2nd DMD pattern and the impinging wave front, according to Huygens' Principle.

$$G''(u,v)=G_{DMD_2}(u,v)\cdot G'(u,v) \quad \text{Eq. 6}$$

The resulting beam is inverse Fourier transformed obtaining the convolution in the real space (with flipped axis). This step considers the aberration and f number of the 2nd Fourier lens with the rationale of having an image in the image plane of the same size of the CCD sensor (factor 11).

$$g_{out}(x',y')=\int_{-\infty}^{+\infty}\int G''(u,v)\exp[-i2\pi(ux'+vy')]dudv \quad \text{Eq. 7}$$

In the algorithm, the CCD camera accomplishes the dimensionality reduction integrating the optical power (square optical intensity) mapping each expanded 17×17 super-pixel to a single pixel (factor 12). It is worth mentioning that the algorithm used for modelling the system can be used for similar 4f system which uses miniaturized reprogrammable metasurfaces and flat diffractive metalenses. In that case, the characterization of the optical tools and their inaccuracies would have even a greater impact to the results provided by the optical engine.

(D). The Simulated-Optical-Processor as Convolution Layer

A Simulated-Optical-Processor which may be used as convolution layer in a neural network (NN) is described with reference to FIG. 6. The Simulated-Optical-Processor is implemented via a software-routine run on a computing system. The Simulated-Optical-Processor is configured to receive an input-image and a kernel and to generate an output-image as shown in FIG. 6(*b*).

The output-image of the Simulated-Optical-Processor is obtained by emulating the Analog-Optical-Processor, i.e., performing computer simulations predicting the output-image (as function of the input-image and the kernel) which would be generated by the actual Analog-Optical-Processor (see FIGS. 6(*a*) and (*b*)). The computer simulations may be conducted according to the physical model described above and may include all relevant parameters of the hardware Analog-Optical-Processor.

The output-image may be calculated as described with reference to equations 1-7 and will be a function of the input-image, the kernel, and the physical model parameters (e.g. dimensions, materials, and configurations of the optical components). In an exemplary embodiment, the emulated-convolution-layer (simulated Analog-Optical-Processor) may be implemented as an algorithm configured to calculate the output-image via the function $g_{out}$(x', y') in Equation 7.

If the simulations of the physical model are good, the Simulated-Optical-Processor should bring outcomes similar to the Analog-Optical-Processor. In other words, for the same pair input-image & kernel, the output-images generated by the Simulated-Optical-Processor and by the Analog-Optical-Processor should be very similar (if the simulation is perfect then the output of the Simulated-Optical-Processor and the Analog-Optical-Processor should be identical).

In one example embodiment, the Simulated-Optical-Processor may be implemented as a convolution-layer in a NN and could be used to perform classification of images.

Figure 7:
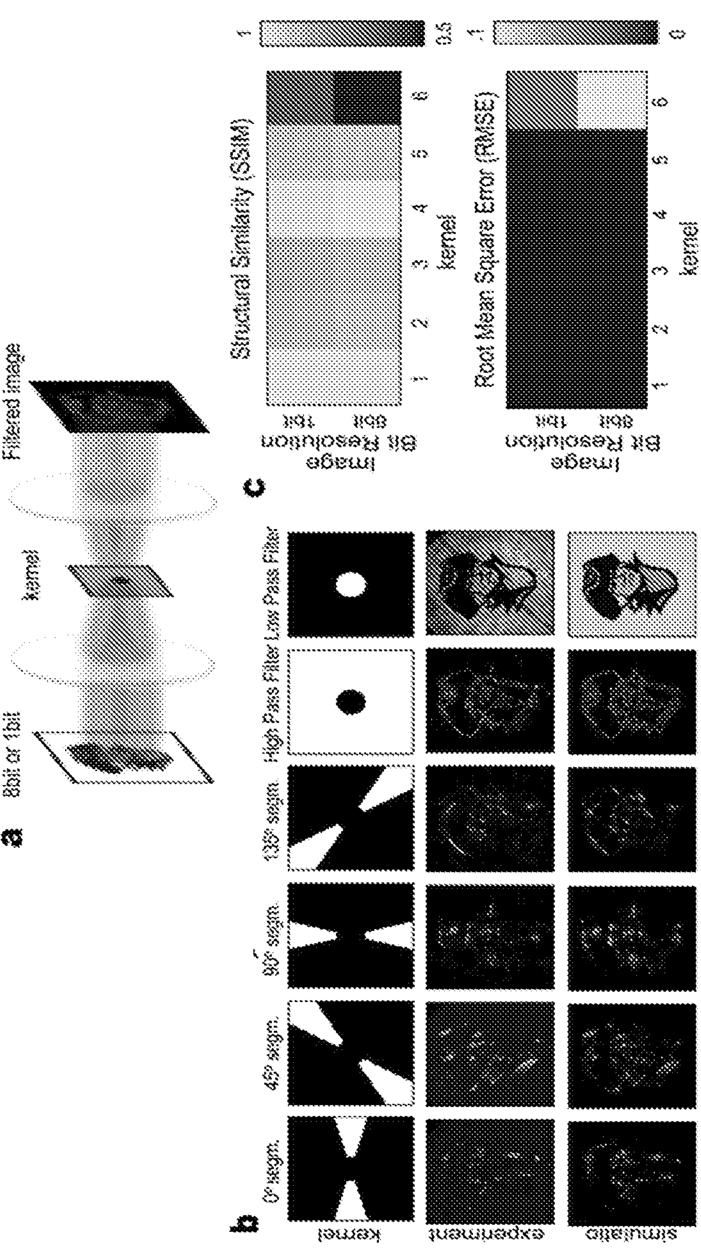
FIGS. 7*a, b, c* show a comparison with respect to classification performance between experiments performed via the Analog-Optical-Processor and simulations based on the physical model.

The image-output of an Analog-Optical-Processor and the Simulated-Optical-Processor are compared, as explained with reference to FIG. 7. The embodiment uses an 8 bit (grey scale) high-resolution logo (head of George Washington) as input-image and six kernels (as seen in FIG. 7*b*). The output-images generated by the Analog-Optical-Processor have been obtained experimentally for each of the six kernels. The output-images generated by the Simulated-Optical-Processor have been obtained by simulations for each of the six kernels. As seen in FIG. 7*b* the images output by the Simulated-Optical-Processor are quite similar to the images output by the Analog-Optical-Processor. The comparison between numerical simulation and experimental results for several kernels proves there is a very good agreement between experiment and model, which is also expressed in terms of Structural Similarity (SSIM) and Root mean square error (RMSE).

(E). The Analog Optics Based Convolutional Neural Network (Analog-Optics-CNN)

Analog optics based convolutional neural network (hereinafter referred as Analog-Optics-CNN) are described hereinafter with reference to FIG. 8. The Analog-Optics-CNN is a convolutional neural network systems including a Analog-Optical-Processor.

In an exemplary embodiment, an Analog-Optics-CNN system may include a DMD based Analog-Optical-Processor, as in FIG. 1-3, configured to perform a convolution between input-images and kernels, and to capture output-images via a CCD camera. The Analog-Optics-CNN system may be used to perform convolutions between any combinations of input-images (out of a set of input images) and kernels (e.g. the 16 kernels shown in FIG. 8). The Analog-Optics-CNN may further include a computer system configured to implement one or more CNN layers, such as: an extraction layer; a batch normalization layer; a max pooling layer; a flattening layer; a Fully Connected Layer (FC); and a Rectifier linear unit (ReLu) layer. The structure and functioning of these computer implemented CNN layers are well known by the artisan in computer sciences fields such as machine learning and AI. The Analog-Optics-CNN may be configured to perform the classification of the input-images into a set of classes (e.g. cat, dog, tiger, bear, etc.). The Analog-Optical-Processor convolution layer is implemented in optical domain whereas the other layers are implemented in the Electrical Domain via one or more computing systems.

A method for performing image classification via the Analog-Optics-CNN system is described hereinafter with reference to FIGS. 2, 8. An input-image (18) (e.g. image to be analyzed, such as the cat image in FIG. 8) is loaded into the DMD-1 (3) and a first kernel (out of a set of kernels) is loaded into DMD-2 (5). The Analog-Optical-Processor performs the Fourier convolution between the input-image and the kernel and the camera (7) captures the convoluted image transferring it into electrical domain. The 4f convolution operation is repeated for the input-image with each of the kernels in a set of kernels (e.g. 16 pre-trained kernels) and a corresponding output-image is captured by the camera for each of the kernels. The output-images are run/pushed through the electrical domain layers of the Analog-Optics-CNN thereby performing the classification of the image (i.e. returning classification parameters, such as: the most likely class, the loss, accuracy, etc.).

Figure 8:
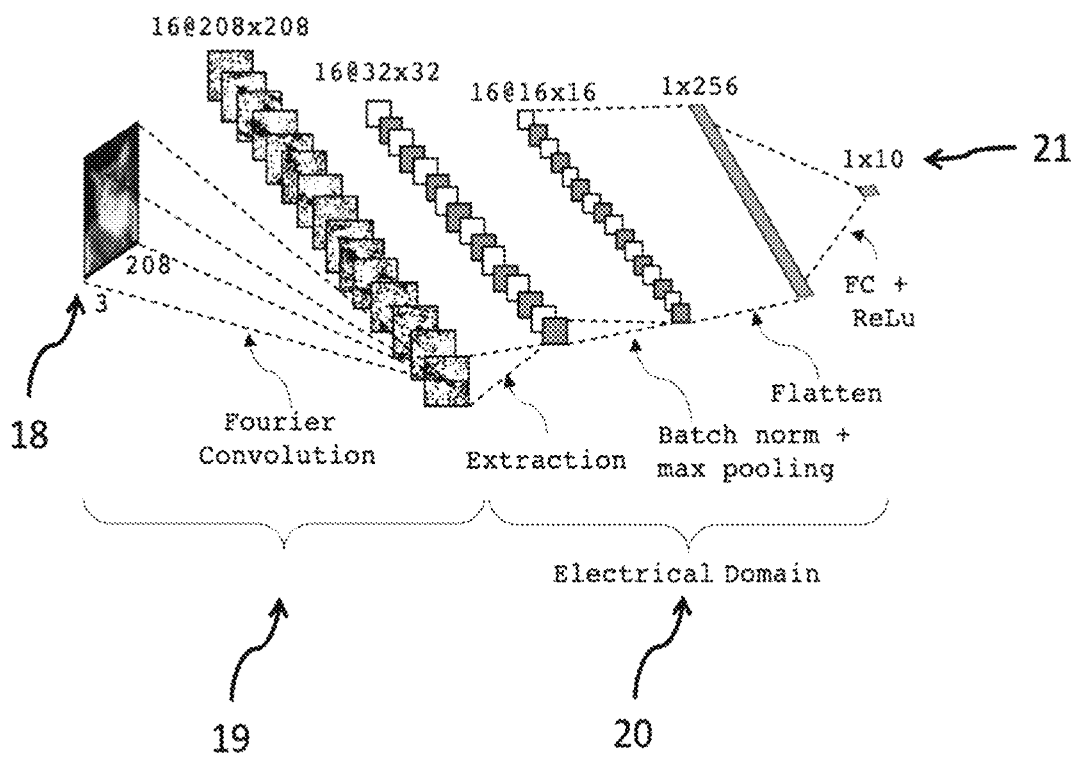
FIG. 8 shows an optics based convolutional neural network (i.e. Analog-Optics-CNN).

In the exemplary embodiment shown in FIG. 8, the input-image (18) loaded in the DMD-1 (3) may be a 208×208 pixels image from CIFAR-10 dataset (i.e. CIFAR-10 dataset is a collection of images that are commonly used to train machine learning and computer vision algorithms) so as to match the optical system (e.g. size of lenses and the DMDs). The input DMD-1 image is Fourier Transformed by FL1 lens (4) on a first pre-trained kernel (out of 16 pre-trained kernels) implemented via DMD-2 (5). The pre-trained kernel is also a 208×208 pixels kernel. The output-image of the multiplication is transferred back to spatial domain by $FL_2$ and is captured by the CCD/Camera (7) and converted into electrical domain.

The Analog-Optical-Processor system performs a matrix multiplication/convolution in optical domain (19) between the image (18) and the kernel. The convolution operation is repeated for each of the 16 pre-trained kernels, thereby obtaining 16 output-images (see 16@208×208 images in FIG. 8). After that follows a set of steps in the electrical domain (20). The 16 output-images are run through an extraction layer, wherein images are reduced to 16 matrixes of 32×32 pixels. The output of the extraction layer is run through a batch normalization and pooling layer wherein the images are further reduced to 16 matrixes of 16×16 pixels. The output of the max pooling layer is run through a flattening layer thereby outputting a 1×256 matrix. The output of the flattening layer is run through a Fully Connected and a ReLu function layer thereby outputting a 1×10 matrix (21) wherein each of the 10 elements of the matrix encodes 10 different classes. Thus, a complete run through the Analog-Optics-CNN system performs the classification of the input-image into a set of classes (e.g. class-1=cat, class-2=dog; class-3=sparrow; . . . ; class-9=no cat). For example, if the input-image includes a cat, the Analog-Optics-CNN may return a 1×10 vector having the first element (i.e. corresponding to class-1=cat) equal to "1" whereas the other 9 elements are "zero".

(F). CNN Using the Simulation Routine (Simulated-Optics-CNN, Electronics Only)

The Simulated-Optics-CNN system is a CNN system including all layers of the Analog-Optics-CNN described with reference to FIG. 8 except that the convolution layer (i.e. the Analog-Optical-Processor) is replaced by a convolution layer implemented via the software routine of the Simulated-Optical-Processor (as seen in FIG. 9). The Simulated-Optical-Processor convolutional layer is implemented in electronics domain only via a software-routine running on a computing system, as explained above with reference to FIG. 6.

FIG. 9 shows two convolutional neural networks (CNNs): an Analog-Optics-CNN (FIG. 9(*a*)) and its corresponding Simulated-Optics-CNN (FIG. 9(*b*)). Except for the convolution layer, all layers of the Simulated-Optics-CNN are identical with the layers of the Analog-Optics-CNN. Moreover, if the simulations of the physical model are good, the Simulated-Optical-Processor (i.e. the convolution layer in the Simulated-Optics-CNN) should bring outcomes similar to the Analog-Optical-Processor (i.e. the convolution layer in the Analog-Optics-CNN). Thus, the Analog-Optics-CNN and its corresponding Simulated-Optics-CNN should have similar classification performance. If the simulation is perfect then the output of the Simulated-Optics-CNN and the Analog-Optics-CNN should be identical.

Figure 10:
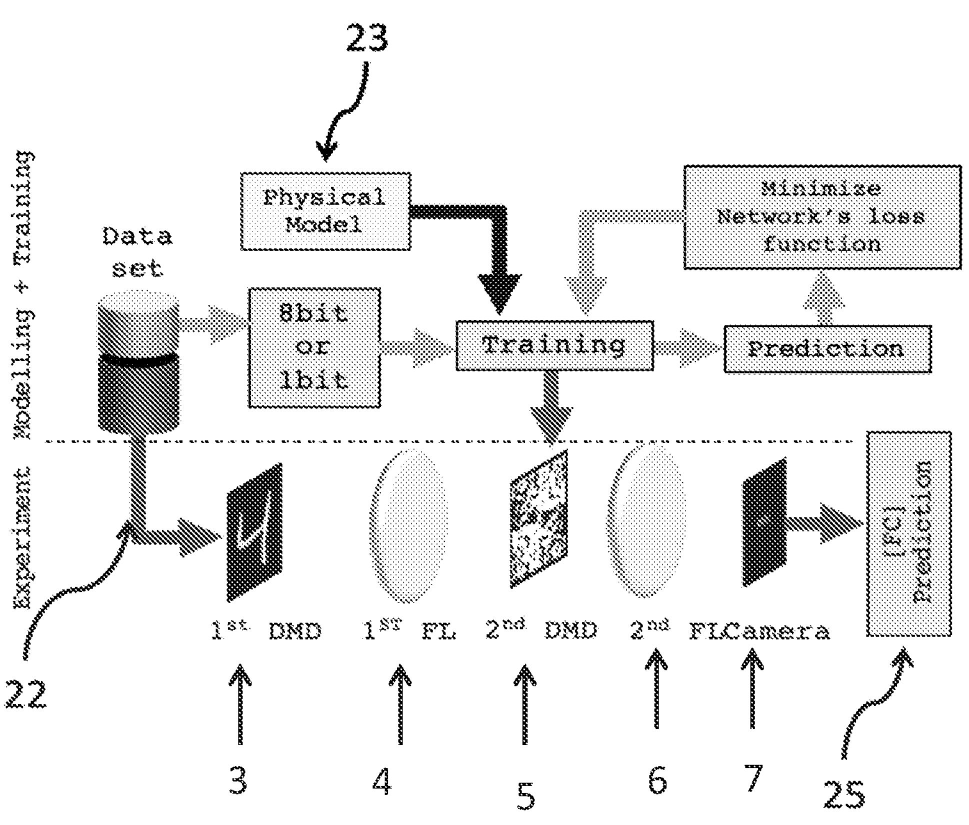
FIG. 10 shows a flow-chart of a training process for the Analog-Optics-CNN.

FIG. 10 shows a Flow-chart of the training process for benchmarking dataset (22). The physical model (23) of the amplitude only convolutional layer is used for training the entire CNN and for obtaining the weights for the kernel to be loaded in the 2nd DMD (5) of the convolution layer (24). Experimentally obtained results (25) of the Amplitude Only Fourier filtering (performed by the Analog-Optical-Processor) are fed to the Fully Connected layer (FC) for performing the final prediction on unseen data. An ulterior fine-tuning process compensating for hardware inaccuracy which the physical model does not consider, can be implemented using the hardware-obtained convolution results in order to re-train the fully connected weights of the layer using a limited number of training samples.

(G). Training the Simulated-Optics-CNN System and Obtaining Pre-Trained Kernels

The Simulated-Optics-CNN system is a proper CNN system and consequently can be trained, via known training methods in the machine learning field, so as to obtain the layer weights most suitable (or improved) for performing image classification for various classes of images (e.g. images in CIFAR-10, images in MNIST).

In an exemplary embodiment, a training algorithm may be performed, via a computer, on the Simulated-Optics-CNN system (shown in FIG. 9(*b*)) thereby obtaining improved weights for a set of kernel layers that optimize the classification process. The training algorithm may include a step where input-images are received from a Data Set (e.g. MNIST); a step where a set of initial-kernels are received from a Data Set; a step where information is acquired about the physical/hardware model (such as the configuration of the 4F Analog-Optical-Processor and other parameters necessary to perform the simulation of the 4F Analog-Optical-Processor); steps implementing other layers of the Simulated-Optics-CNN system, such as performing a prediction or classification of the input-image and minimizing network's Loss Function (FIG. 10). The obtained improved kernel weights are used to form a set of trained kernels optimizing the classification process. In an exemplary embodiment, training may include optimization of weights of other CNN layers, different from the kernels. The training algorithm may be performed via commercially available software, such as PyTorch (see e.g. https://pytorch.org/)

The training process (and finding the optimal kernels and weights) is performed on the Simulated-Optics-CNN instead of directly on the Analog-Optics-CNN (online learning/training) because of advantages of offered by the current computer systems, such as: speed (~500 MHz for the GPU compared with 10 kHz update rate of the DMDs) and ease of manipulating lots of data.

If the simulations of the physical model are good, the Simulated-Optics-CNN system should perform similarly to the Analog-Optics-CNN system (if the simulation were perfect then the output of the Simulated-Optics-CNN and the Analog-Optics-CNN would be identical). Thus, if the trained kernels and trained FC-weights are optimizing the Simulated-Optics-CNN system then it is very likely they will optimize the Analog-Optics-CNN system.

An Analog-Optics-CNN system is disclosed (such as described with reference to FIGS. 9-10) receiving at its DMD-2 the pre-trained kernels obtained via the Simulated-Optics-CNN. The Analog-Optics-CNN system can be used to perform classification of the images as explained in the following.

A method for using an Analog-Optics-CNN system in conjunction with its corresponding Simulation-Optics-CNN system to perform classification on a set of input-images is described with reference to FIG. 11. The method may include one or more of the following steps:

(a). simulate the Analog-Optical-Processor convolution layer as described with reference to FIG. 5, form software algorithm for the Simulated-Optical-Processor and the Simulated-Optics-CNN (software/electronics implemented);

(b). run a training algorithm on the Simulated-Optics-CNN (always in electronics, via software routines), determine the trained kernel weights and generate the pre-trained kernels. The training algorithm may include a step where input-images are received from a Data Set (e.g. MNIST); a step where a set of initial-kernels are received from a Data Set; steps implementing other layers of the Simulated-Optics-CNN system, such as performing a prediction or classification of the input-image and minimizing network's Loss Function (FIG. 10). The training algorithm may be performed via a commercially available software such as PyTorch (see https://pytorch.org/);

(c). run the Analog-Optics-CNN to perform classification on a set of input-images while using the pre-trained kernels obtained at step (b) in the second DMD (i.e. perform actual convolution in optics between input-images and the pre-trained kernels, capture the output-images at the CCD camera, and process the output-images through the other CNN layers);

(d). for each input-image, generate information such as: class, accuracy, loss, etc.

(H). Comparison Between Experimental Results and Simulation

Figure 12:
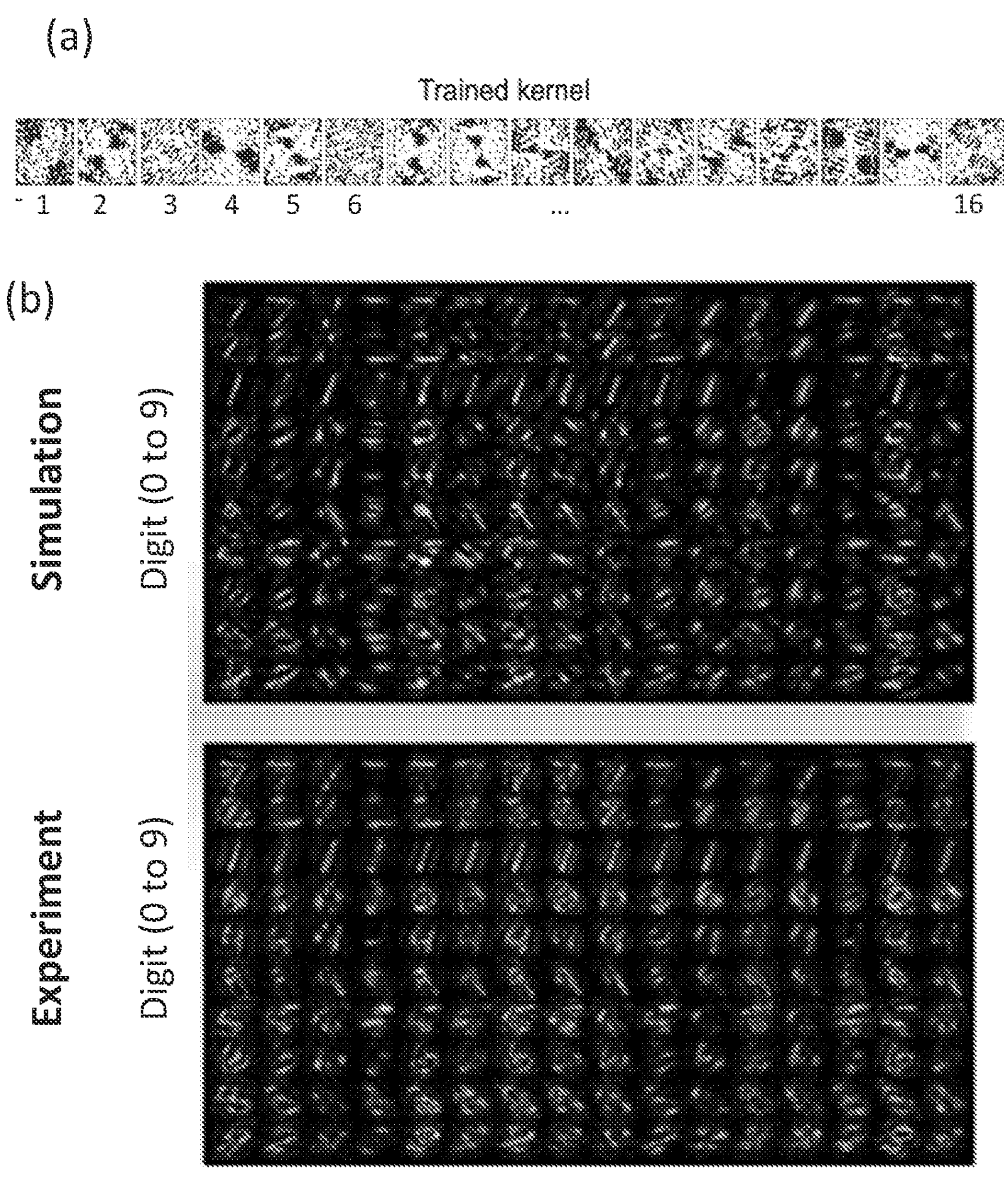
FIGS. 12*a, b* show a comparison with respect to classification performance between experiments performed via the Analog-Optical-CNN and simulations based on the physical model.

The inventors herein have tested the Analog-Optics-CNN system and the Simulated-Optics-CNN as described in the following with reference to FIGS. 12-13. The Simulated-Optics-CNN software was run via the processor as an image classifier, performing automated classification of handwritten digits. For this task, training was performed for a 1-layer convolutional layer followed by a FC layer with 55,000 images (5000 validation images) from the MNIST (Modified National Institute of Standards and Technology) handwritten digit database. The input digits were encoded as amplitude and the Simulated-Optics-CNN was trained to obtain the kernels (16, 208×208 binary images as shown in FIG. 12(*a*)) to be used by the Analog-Optics-CNN in the second DMD (5). FIG. 12(*a*) shows the 16 kernels obtained during training for the classification of handwritten digits (MNIST dataset).

After the training, the Analog-Optics-CNN system was blind tested, adopting the obtained kernels and using unseen images from the MNIST test dataset (not used as part of the training/validation) and achieved a 98% classification accuracy. At this stage for validating the hardware implementation we perform convolutions between the kernels and unseen feature maps using the optical engine.

The results of the emulated and experimental convolution layer are compared in terms of transformed feature maps and classification accuracy. Since our simulation model already considers some nonidealities of the optical hardware, the convolution results of the hardware implementation match the simulation result quite well qualitatively and their shapes are almost identical as can be seen in FIG. 12(*b*). In FIG. 12(*b*) can be seen the output results of the emulated and experimental implementation of the convolution layer for different kernels (x-axis) and input images (y-axis). Although, the match is not perfect quantitatively, as highlighted by a lower SSIM (Structural Similarity Index Measure) as seen in FIG. 13(*a*). This is due to several concurring factors including a) small misalignment in the optical setup, b) model which takes into account unphysical reflection of grid boundaries, c) non-ideal camera dynamic range.

Figure 13:
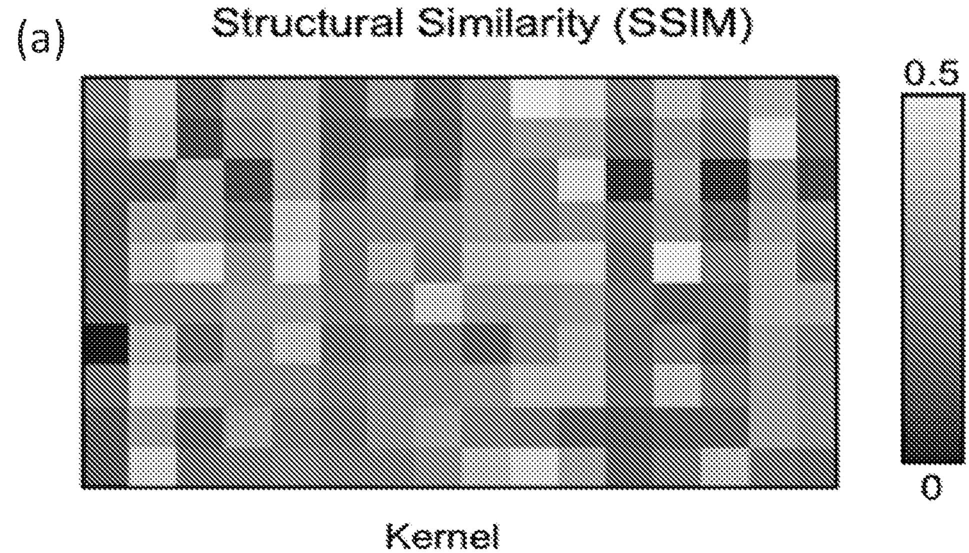
FIGS. 13*a*, 13*b* show a comparison between experiments and simulations with respect to the Structural Similarity Index Measure of the output images.

The table in FIG. 13(*b*) shows testing results on the MNIST and CIFAR datasets with respect to the performance of a normal space domain convolution CNN (full precision), the Fourier convolution CNN using the simulation model, Analog-Optics CNN without fine tuning, and the Analog-Optics CNN with fine tuning. More details regarding the tests and the results are found in the Optica article included in the list of references herein (Miscuglio et. al, Optica 7, 1812-1819 (2020)).

The exact pixel values of hardware results differ from the simulation results, thus if the convolution results obtained using the optical hardware are fed into a fully connected layer, whose weights are trained using simulation results, the actual classification accuracy will be significantly affected (92%). However, the Fourier kernel weights still bear the same representative information as the simulation model, and that the fully connected layer weights need to be updated to fit the hardware convolution results, thus compensating for the quantitative discrepancies between the model used for training and hardware implementation.

(I). Fine-Tuning the Analog-Optics-CNN

The physical model cannot take into account all the features of the Analog-Optical-Processor (e.g. lens aberrations, imperfections of the DMDs, misalignments and imperfect distances and angles of components). Moreover, optical systems as the 4F optical processor often change in time because of changes in environmental conditions, such as thermal drift, and others. Consequently, the pre-trained kernels obtained for the CNN using simulations do not match perfectly the hardware Analog-Optics-CNN (since there are performance differences between the Analog-Optics-CNN and the Simulated-Optics-CNN). Therefore, there is a need to fine tune the Analog-Optics-CNN such as to account for the discrepancies between the simulated CNN and the hardware optics CNN. This can be achieved by finding fine-tuned-kernels (and other weights if available) better matching the hardware optics CNN.

Therefore, one embodiment implements an ulterior fine-tuning process which uses the hardware convolution results to re-train the fully connected weights of the layer with a reduced number of training samples. Fine tuning utilizes the knowledge learned via the simulation model from a full training set by determining a mapping from experimental results towards simulation results. Then, the mapping was used to compensate for the hardware-to-model discrepancies. This approach proved to be particularly useful and the tuned hardware results accuracy shows a significant improvement (98%) compared with the one without fine-tuning (92%). Moreover, this fine-tuning approach which compensates for hardware-to-model discrepancies can be used if the optical engine is processing data in harsh environment conditions, for application such as super-resolution on object detection performance in satellite imagery, which can cause random misalignments.

A method for using an Analog-Optics-CNN system in conjunction with its corresponding Simulation-Optics-CNN system to perform classification on a set of input-images is described with reference to FIG. 14. The method may include one or more of the following steps:

(a). simulate the Analog-Optical-Processor convolution layer, as described with reference to FIG. 5, form software algorithm for the Simulated-Optical-Processor and the Simulated-Optics-CNN (software/electronics implemented);

(b). run a training algorithm on the Simulated-Optics-CNN (always in electronics, via software routines), determine the trained kernel weights and generate the pre-trained kernels. The training algorithm may include a step where input-images are received from a Data Set (e.g. MNIST); a step where a set of initial-kernels are received from a Data Set; steps implementing other layers of the Simulated-Optics-CNN system, such as performing a prediction or classification of the input-image and minimizing network's Loss Function (FIG. 10) The training algorithm may be performed via a commercially available software such as PyTorch (see https://pytorch.org/);

(c). perform convolutions, using the hardware Analog-Optical-Processor, between a set of input-images and the pre-trained kernels, thereby obtaining a set of preliminary-output-images;

(d). provide the preliminary-output-images to the Simulated-Optics-CNN and use them as improved training data; run training algorithm on the Simulated-Optics-CNN while using the preliminary-output-images to optimize/fine tune the pre-trained kernels (input-images and the pre-trained kernels obtained at step (b) may be used as start point). Determine the fine-tuned-kernels (e). run the Analog-Optics-CNN to perform classification on a set of input-images while using the fine-tuned-kernels obtained at step (d) in the second DMD (i.e. perform actual convolution in optics between input-images and the fine-tuned kernels, capture the output-images at the camera, and process the output-images through the other CNN layers);

(f). for each input-image, generate classification information such as: class, accuracy, loss, etc.

Improved fine-tuned kernels may be further obtained by repeating steps (c) and (d) wherein the kernels of step (c) are replaced with the fine-tuned kernels. The fine-tuned kernels can be further improved by iteratively repeating steps (c) and (d) a number of "n" times, wherein the kernels used at step (c) of an iteration are the fine-tuned kernels determined at step (d) during the previous iteration.

In an exemplary embodiment, the Analog-Optics-CNN may use a set of kernels obtained by a process including performing training directly on the Analog-Optics-CNN (i.e. online training) or by a process including a combination between performing training on the Simulated-Optics-CNN and performing training on the Analog-Optics-CNN.

(J). Parallelization Schemes for the Analog-Optical-Processor

Figure 15:
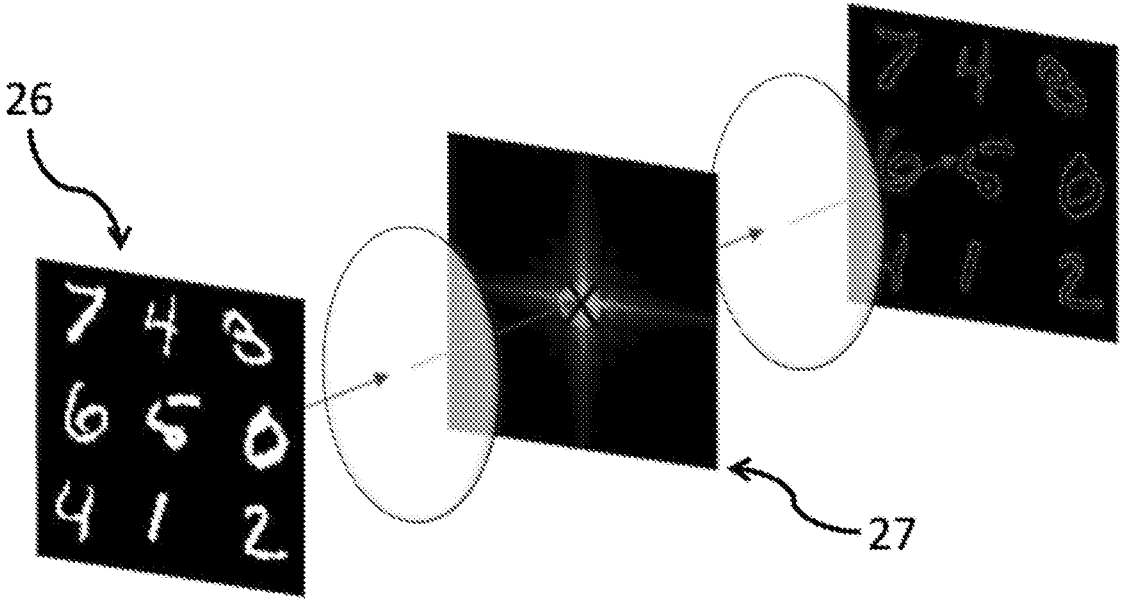
FIG. 15 shows an embodiment of an Analog-Optical-Processor employing a parallelization scheme performing simultaneous batch processing on multiple input images.
Figure 16:
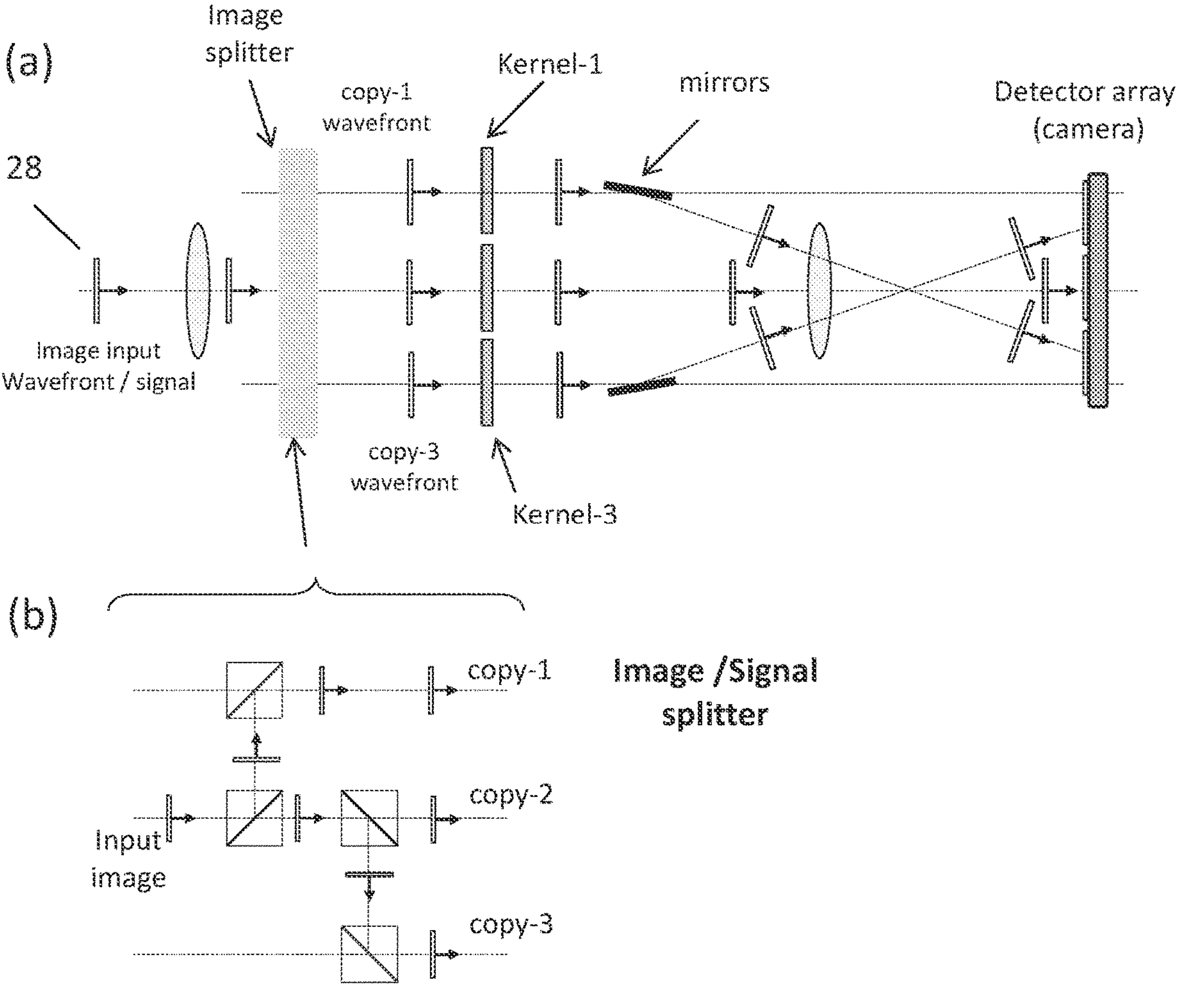
FIGS. 16*a, b* show an Analog-Optical-Processor employing a parallelization scheme where the same input image is simultaneously filtered by multiple kernels.
Figure 17:
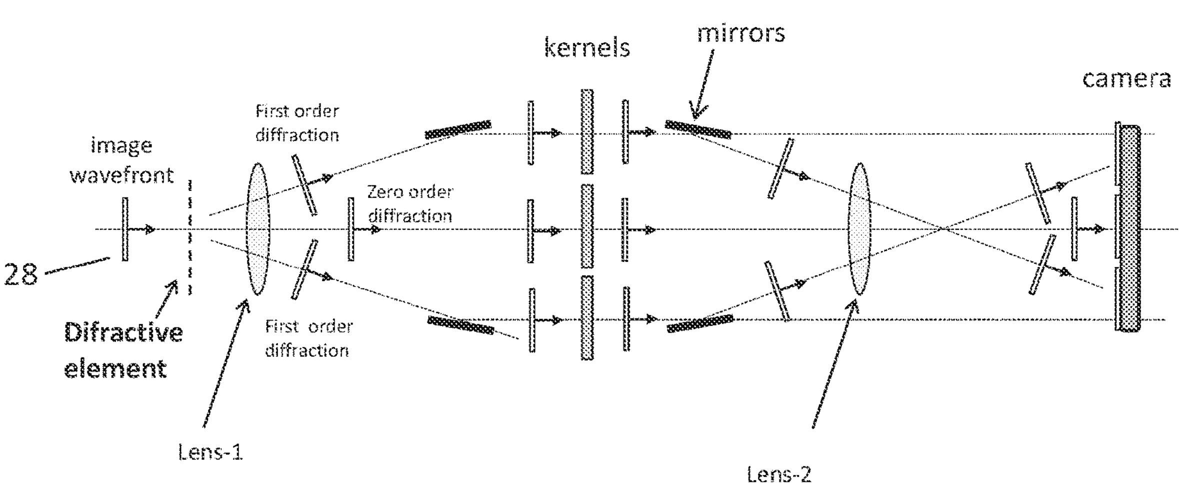
FIG. 17 shows an Analog-Optical-Processor employing a diffraction based parallelization scheme where the same input image is simultaneously filtered by multiple kernels.

FIGS. 15-17 show different parallelization schemes for the optical processing system and methods. FIG. 15 shows a first optical processing system implementing a batch processing scheme leveraging on the vast parallelism provided by the optical processing system (e.g. 2 Mega Pixels for the DMDs and the camera). The all-optical processing system (AO Fourier based convolutional layer) can operate as the convolutional layer more parallelly if the input images (e.g. 208×208 pixel) are smaller compared to the resolution offered by the DMD (>2MPx) and the camera.

FIG. 15 shows an embodiment where multiple images (e.g. 9 images) may be tiled into the input plane (e.g. DMD-1 in the 4f system) (26) and batch-processed using the same kernel in the Fourier plane (27). For example, the image showing number "7" is provided on a corner portion of the input plane, the image "7" is Fourier Transformed by a lens on the kernel thereby performing a matrix multiplication/convolution between the image and kernel. The result of the multiplication/convolution is transferred back to spatial domain on the output plane (e.g. CCD camera) as letter "7" (dimmer) displayed on the corner plane. Thereby all the images tiled into the input plane are parallelly and simultaneously processed through the same lenses and kernel of the 4f system.

In an exemplary embodiment, for which an experiment was performed, 46 multiple images (e.g. 208×208 pixels for a 2MPx DMD) were tiled in the input plane and batch-processed using the same kernel in the Fourier plane and same system of lenses.

FIGS. 16 and 17 optical processing systems and architectures employ another parallelization scheme for the 4f system. In this architecture the same input (28) is simultaneously filtered by multiple kernels. In broad terms, the Fourier transformed image generated by a first focal lens of a 4F system is multiplied (e.g. via a plurality of beam splitters) into a plurality of copy-images and each of the copy-images is directed (e.g. via a set of mirrors) to different kernels. The Fourier transformed copy-images may be directed to the different kernels by using opportune beam splitters, array of mirrors and well-dimensioned lenslet array, as known in the art. Each resulting product is inverse Fourier transformed (using a second lenslet array) and imaged by different sensors or different (non-overlapping) portions of one CCD array. The filtered images can be integrated by the same sensor, performing dimensionality reduction.

An exemplary embodiment discloses an optical processor 300 employing multi-kernel parallelization architecture as described with respect to FIG. 16. The processor 300 (shown in FIG. 16(*a*)) may include an image-input incident as a wavefront signal onto a first lens. After emerging from the first lens, the image signal is processed by a signal splitter (FIG. 16(*b*)) configured to create a set of signal copies (copy-1, copy-2 and copy-3 in this case). Each of the image copies is incident upon a separate kernel (i.e. kernel-1, kernel-2, and kernel-3) thereby being processed by the kernel. The three signals emerging from the kernels, representing a convolution between the input signal and the kernel, are further redirected through the second focal lens. The second focal lens Fourier transforms the three signals and directs each of them on separate non-overlapping areas of the detector array. The three signals detected on the detector array are converted into electric domain by the camera and each will represent the convolution between the input image and the corresponding kernel out of the three kernels. Delay elements and geometry of the system may be implemented so as to ensure a 4F spacing between the elements. FIG. 16(*b*) shows an exemplary embodiment of a signal splitter configured to receive one input-image and to generate three separate copies of the input-image.

FIG. 17 shows another exemplary embodiment (i.e. processor 400) of the multi-kernel based Analog-Optical-Processor. In this embodiment the Analog-Optical-Processors employs a diffractive component configured to receive an input image and to create a plurality of output images directed at different angles with respect to the optical axis (as seen in FIG. 17). Each of the plurality of images corresponds to an interference/diffraction order. Each of the plurality of images may be redirected through a separate kernel (as shown in FIG. 17). In an exemplary embodiment, Lens-1 acts as diffractive component and therefore the system does not include a separate diffractive component.

While in FIGS. 16-17 the kernels are shown as transmissive elements for simplicity, the skilled artisan would understand that the geometry of the system can be configured so as to use DMDs (reflective components) to implement the kernels. It is understood that the same system may be implemented for a number of kernels which is much larger than 3 and that the optical processor 300 is not limited by the number of kernels. The kernels may be provided by separate DMDs (one DMD for one kernel) or by separate non-overlapping portions of one DMD (all kernels provided by on DMD simultaneously).

(K). First Example of an Image Classification System (Image Recognition by Aircraft)

FIG. 18 (*a*) shows an Analog-Optical-Processor used as convolutional layer in an image classification system used for real time classification in (36) photogrammetry applications (37) target recognition. The image classification system may be used to perform real-time target and image recognition on images collected by an airplane or a satellite.

FIG. 18(*b*) shows a flow-chart of an exemplary method which can be used to isolate and track targets in maritime environments and to perform potential track prediction.

(L). Second Example of an Image Classification System (Iris Recognition)

Figure 19:
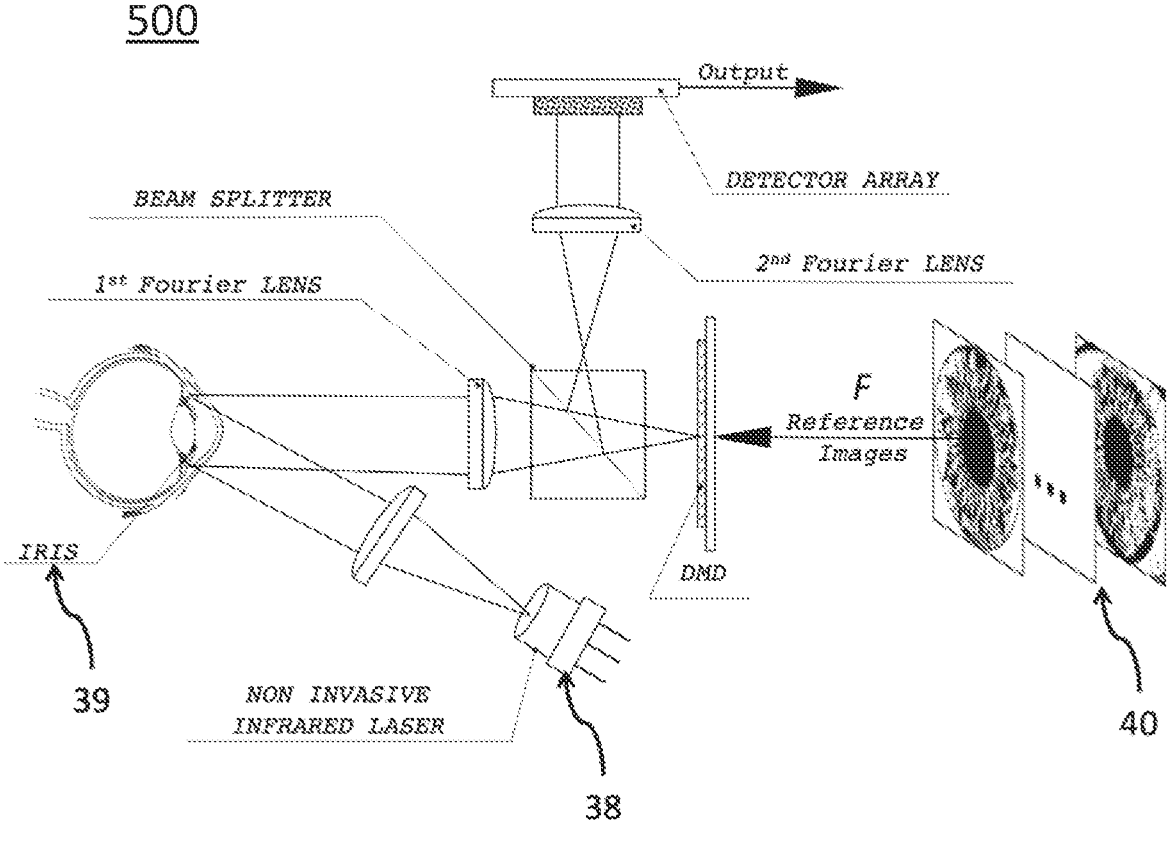
FIG. 19 shows a high-speed iris recognition and classification system.

FIG. 19 shows an exemplary embodiment of an image classification system 500 using an analog optical processor as amplitude-only convolutional layer. The system 500 may be used to perform high-speed iris recognition and classification.

The system 500 includes an analog optical processor having a modified 4F system configuration but functioning similarly to the analog optical processor in FIGS. 1-3. The system may include a non-invasive low power infrared laser (38) whose beam is collimated via a lens or other optical system so as to illuminate the iris (39) of the eye of a user. The collimated light reflected and spatially modulated by the iris's features acts as the input-image in the 4F optical processing system (the iris is in the input plane of the 4F system). The light reflected by the iris is spatially modulated by the iris' features, thereby forming an iris-image. The light reflected from the user's iris is directed to the First Fourier lens and transformed into its spatial frequency component passing through a Fourier lens (1st Fourier Lens) disposed at a first focal distance "f", then the light is directed (e.g. via a beam splitter allowing the light to pass through) to a DMD system disposed two focal distances from the iris in the Fourier plane of the 4F system. At the Fourier plane, the Fourier transform of the iris interacts with the pattern generated by a DMD, loaded with different signatures updating at a speed such as 20 kHz (40). The light reflected/modulated by the DMD is directed (e.g. via a beam splitter reflecting the light) towards the 2nd Fourier Lens, inverse transformed and imaged by a camera for subsequent post processing. The iris-images received at the camera may be further processed by other layers of a neural network, such as Fully Connected Layer, thereby being classified in a set of classes. The system may further perform image recognition on the iris-images by determining if one or more of the iris-images corresponds to a certain person (which person may be granted access to a certain facility or service).

It is important to note here that in this exemplary embodiment the input-image (displayed at the input/object plane) is not provided via DMDs but it comes directly from the object to be classified, i.e., the iris. Thus, the iris itself provides space modulation of the input image.

In an exemplary embodiment of the invention, it is disclosed an optical system for performing tensor operations wherein the optical system includes or employs an Analog-Optical-Processor. The system for performing tensor operations may be any suitable system, such as the one disclosed in the International Patent Application PCT/US2020/028516 titled "Photonic Tensor Core Matrix Multiplier" invented by the inventors herein, and incorporated herein by reference.

In an exemplary embodiment of the invention it is disclosed a system for solving differential equations, wherein the system includes or uses the Analog-Optical-Processor.

The inventions herein are not limited by DMD's configurations and parameters, such as number of micromirrors, dimension of micromirrors. It is understood that various types of DMDs may be used without limiting the scope of the invention. The DMDs may include 2 million individually controlled and programmable micromirrors (higher resolution is also achievable), with a resolution depth of 8 bit and a speed of 1,031 Hz (~20 kHz with 1 bit resolution). The DMDs may enable the achievement of reprogrammable operations for (near) real-time, which is about 100×lower system latency with respect to current GPU accelerators (SLM-based systems) image processing, with a maximum throughput of 4-Peta operations per second at 8 bit resolution, emulating on the same platform multiple convolutional layers of a neural network.

The inventions are not limited by the optical devices used to generate the spatial amplitude filters, the spatial light modulators and the amplitude-only patterns (e.g. the input images, the kernel patterns, the input matrix, the kernel matrix). It is understood that various types of optical devices may be used to generate the amplitude-only patterns without limiting the scope of the invention. The spatial light modulators may be implemented via devices such as DMDs, high-speed analog micro-opto-electro-mechanical systems (e.g. with large resolution and fast switching rate), patterned diffractive masks or materials, such as phase change materials (e.g. the phase change materials and chips described in the International Patent Application number PCT/US2021/034286, titled "Low Loss Multistate Photonic Memories" applied for by the inventors herein), which is incorporated herein by reference. The input images and the amplitude-only filters (kernel) may be any of two-dimensional matrixes/images, mono-dimensional, gray-scale, binary, multichannel (e.g. colored) images. Amplitude-only fixed filters, films or selectively patterned materials (such as Phase change materials) may be utilized, both in the object and Fourier plane. Arrangements of the optical processor may use both transmissive and reflective amplitude-only spatial modulators in both object and Fourier plane.

The inventions are not limited by the optical components used to perform the Fourier transforms (e.g. the Fourier lenses). It is understood that various types of optical components may be used to perform the Fourier transforms without limiting the scope of the invention. For example, the Fourier lenses may be replaced by short distance diffractive optical elements, curved mirrors or metalenses or meta-reflector.

While in the embodiments herein one single laser line was used to generate the input image and perform convolutions, it is understood that multiple wavelengths can be used for performing convolutions on multichannel (RGB) images, for instance by selectively detecting colors, utilizing prisms and monochromatic sensors or color (white light) sensors. In certain applications, if the spatially modulated signal is already in the optical domain (e.g. the Iris Recognition System above), the front Digital micromirror devices may not be needed.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

It is noted that the drawings may illustrate, and the description and claims may use geometric or relational terms, such as right, left, above, below, upper, lower, side, top, bottom, linear, curved, elongated, parallel, perpendicular, rectangular, square, etc. These terms are not intended to limit the disclosure and, in general, are used for convenience to facilitate the description based on the examples shown in the figures. In addition, the geometric or relational terms may not be exact.

The disclosure of the following references are incorporated by reference herein in its entirety: (1). Mario Miscuglio, Zibo Hu, Shurui Li, Jonathan K. George, Roberto Capanna, Hamed Dalir, Philippe M. Bardet, Puneet Gupta, and Volker J. Sorger, “Massively parallel amplitude-only Fourier neural network,” Optica 7, 1812-1819 (2020) (including its supplements and cited references); (2). International Patent Application number PCT/US2021/034286, titled “Low Loss Multistate Photonic Memories”, filed on May 26, 2021, and invented by inventors of this application; and (3). International Patent Application PCT/US2020/028516 titled “Photonic Tensor Core Matrix Multiplier” invented by the inventors of this application.

Accordingly, the entire system and operation is conducted automatically, and without any manual interaction. Thus, the process occurs substantially in real-time without any delay or manual action. In addition, the system operates dynamically; for example, the various components continually receive signals for training and operation.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

The invention claimed is:

1. An analog optics based convolutional neural network (CNN) for optical information processing for performing data classification and/or processing, the Analog-Optics-CNN comprising:

(a) a convolution layer comprising an Analog-Optical-Processor for performing matrix operations and data or image processing, the processor comprising:

a first-spatial-amplitude-filter disposed at an input-plane and projecting an input-image;

a first-focal-lens receiving the input-image from the first-spatial-amplitude-filter and Fourier transforming the light corresponding to the input-image;

a second-spatial-amplitude-filter receiving the Fourier transformed light from the first-focal-lens and spatially modulating the light;

a second-focal-lens receiving the spatially modulated light from the second-spatial-amplitude-filter, and performing an inverse Fourier transform on the light; and a detector-array receiving the inverse Fourier transformed light from the second-focal-lens, and forming an output-image in electrical domain;

wherein the convolution layer is configured to perform a convolution between an input-image and a kernel, and to generate an output-image;

wherein the Analog-Optical-Processor is a 4f Fourier optical system in which there is a one focal-length spacing between each of the first-spatial-amplitude-filter, the first focal-lens, the second-spatial-amplitude-filter, and the second focal-lens;

wherein the second-spatial-amplitude-filter is a kernel Digital Micromirror Device (kernel-DMD); and (b) one or more layers implemented in electronic domain via a computer system, configured to receive the output-image and to perform classification on the output image, wherein the one or more layers comprise a Fully Connected layer.

2. The Analog-Optical-Processor of claim 1 wherein the first-spatial-amplitude-filter is an input Digital Micromirror Device (input-DMD) receiving a collimated beam.

3. The Analog-Optical-Processor of claim 2, further comprising a computer system configured to provide input-images to the input-DMD, thereby causing the input-DMD to display the input-images; provide one or more kernels to the kernel-DMD, thereby causing the kernel-DMD to display the kernels; and receive output-images from the detector-array and perform processing on the output-images.

4. The Analog-Optical-Processor of claim 3, wherein output-images provide optical convolutions between corresponding input-images displayed at the input-DMD and kernels displayed at the kernel-DMD.

5. A method of using the Analog-Optics-CNN of claim 4, the method comprising:

storing a set of kernels and a set of input-data or input-images on the computing system;

at the input-DMD, forming a combined-input-data or combined-input-image comprising the input-data or input-images, each of the input-images being disposed on non-overlapping areas of the combined image;

for each kernel in the set of kernels, performing convolutions between the combined-image and the kernel by using the Analog-Optical-Processor, thereby generating at the detector array a set of combined-output-images corresponding to convolutions between the combined-input-data or input-image and each of the kernels;

for each of the combined-output-images, deconstructing the combined-output-images into output-images, each of the output-images corresponding to the convolution between one kernel and one input-image of the combined-input-image;

for each input-image, forming an output-matrix comprising the output-images formed as convolution between the input-image and each of the kernels;

processing the output-matrixes via the one or more layers implemented in electronic domain and configured to perform classification of images;

performing classification of each of the input-images in one or more classes.

6. The Analog-Optical-Processor of claim 2 further comprising a system configured to control the alignment of the Analog-Optical-Processor.

7. The Analog-Optics-CNN of claim 4, further comprising one or more convolution layers implemented by the Analog-Optical-Processor and a plurality of electronic domain layers, wherein the Analog-Optical-Processor is used recursively to implement multiple convolution layers; and wherein some of the data generated at the output of the Analog-Optical-Processor and further processed by electronic domain layers is used as input data of a subsequent convolution layer implemented via the Analog-Optical-Processor.

8. A method of using the Analog-Optics-CNN of claim 1, the method comprising the following steps:

storing a set of kernels on the computing system;

receiving an input-image at the input-DMD;

for each kernel in the set of kernels, performing convolutions between the input-image and the kernel by using the Analog-Optical-Processor, thereby generating at the detector array a set of output-images corresponding to a convolution between the input-image and each of the kernels;

processing the output-images via the one or more layers implemented in electronic domain; and performing a classification of the input-image in one or more classes.

9. The method of using the Analog-Optics-CNN of claim 8, further comprising:

forming a software-routine simulating the functioning of the Analog-Optical Processor by using a physical model of the Analog-Optical-Processor, forming a convolutional-neural-network having the same configuration and comprising the same layers as the Analog-Optics-CNN except that the Analog-Optical-Processor is replaced by the software-routine;

running a training algorithm on the convolutional-neural-network and determining a set of pre-trained kernels.

10. The method of using the Analog-Optics-CNN of claim 9, further comprising:

receiving the pre-trained kernels;

running the Analog-Optics-CNN to perform classification on a set of input-data or input-images while using the pre-trained kernels as kernels in the Analog-Optical-Processor;

for each input-data or input-image, generating at the output classification information regarding the input-image.

11. The method of using the Analog-Optics-CNN of claim 9, further comprising:

(a) performing convolutions, using the Analog-Optical-Processor, between a set of input-images and the pre-trained kernels, thereby obtaining a set of preliminary-output-images;

(b) running a second training algorithm on the convolutional-neural-network, while using the preliminary-output-data as improved training data, and determining a set of fine-tuned kernels, wherein the second training algorithm is configured to determine fine-tuned kernels compensating for discrepancies between the physical model and the actual Analog-Optical-Processor.

12. The method of using the Analog-Optics-CNN of claim 11, further comprising:

(a) performing convolutions, using the Analog-Optical-Processor, between a set of input-images and the fine-tuned kernels, thereby obtaining a set of preliminary-output-images;

(b) running a training algorithm on the convolutional-neural-network, while using the preliminary-output-data obtained at step (b) as improved training data, and determining a second set of fine-tuned kernels;

iteratively repeating steps (a) and (b) for a number of "n" iteration, wherein the finetuned kernels used at step (a) of an iteration are the fine-tuned kernels determined at step (b) during the previous iteration.

13. The method of using the Analog-Optics-CNN of claim 11, further comprising:

receiving the fine-tuned kernels;

running the Analog-Optics-CNN to perform classification on a set of input-images while using the fine-tuned kernels as kernels in the Analog-Optical-Processor;

for each input-image, receive at the output classification information.

14. The method of using the Analog-Optics-CNN of claim 8, further comprising running a training process directly on the Analog-Optics-CNN.

15. A system for performing high-speed iris classification and recognition, the system comprising:

(a) a non-invasive low power infrared laser source whose beam is collimated to illuminate the iris of an eye so as to define an iris-image;

(b) a first-focal-lens receiving the iris-image as light reflected by the iris and disposed one focal-length from the iris;

(c) a DMD disposed on a Fourier plane at one focal-length from the first-focal-lens and configured to form reflective patterns spatially modulating the light of the iris-image, wherein each of the reflective patterns corresponds to an iris-signature;

(d) a second-focal-lens receiving the light modulated by the DMD and disposed one-focal-length from the DMD;

(e) a detector-array disposed one focal-length from the second-focal-lens, receiving the light corresponding to the iris image and forming an output-image in electrical domain;

(f) one or more neural network layers configured to process the output-images and to perform the classification of the iris-image.

* * * * *